US011763604B2

(12) United States Patent
Orevi et al.

(10) Patent No.: US 11,763,604 B2
(45) Date of Patent: Sep. 19, 2023

(54) LIVENESS DETECTION BASED ON REFLECTIONS ANALYSIS

(71) Applicant: NEC Corporation Of America, Herzlia (IL)

(72) Inventors: Liran Orevi, Rishon-LeZion (IL); Mark Vexler, Hod-HaSharon (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 18/097,306

(22) Filed: Jan. 16, 2023

(65) Prior Publication Data

US 2023/0215220 A1   Jul. 6, 2023

Related U.S. Application Data

(63) Continuation of application No. 17/215,134, filed on Mar. 29, 2021, now Pat. No. 11,562,600.

(51) Int. Cl.
  *G06V 40/18*     (2022.01)
  *G06V 40/40*     (2022.01)

(52) U.S. Cl.
  CPC ............ *G06V 40/45* (2022.01); *G06V 40/193* (2022.01)

(58) Field of Classification Search
  None
  See application file for complete search history.

(56) References Cited

U.S. PATENT DOCUMENTS

| 7,801,335 | B2 * | 9/2010 | Hanna | G06V 40/45 382/117 |
| 8,542,879 | B1 * | 9/2013 | Nechyba | G06V 40/171 382/118 |
| 10,691,939 | B2 * | 6/2020 | Xue | H04N 23/611 |
| 11,562,600 | B2 * | 1/2023 | Orevi | G06V 10/60 |
| 2017/0344793 | A1 * | 11/2017 | Xue | G06V 40/45 |
| 2017/0364732 | A1 * | 12/2017 | Komogortsev | G06T 7/248 |
| 2018/0096212 | A1 * | 4/2018 | Lin | G06V 40/168 |
| 2018/0181737 | A1 * | 6/2018 | Tussy | G06V 40/172 |
| 2019/0205680 | A1 * | 7/2019 | Miu | G06V 40/45 |
| 2019/0392145 | A1 * | 12/2019 | Komogortsev | G06F 21/32 |
| 2022/0309283 | A1 | 9/2022 | Orevi et al. | |

FOREIGN PATENT DOCUMENTS

AU       2018247216       11/2018

OTHER PUBLICATIONS

Notice of Allowance dated Oct. 20, 2022 From the U.S. Patent and Trademark Office Re. U.S. Appl. No. 17/215,134. (5 Pages).
Official Action dated Jul. 21, 2022 from U.S. Patent and Trademark Office Re. U.S. Appl. No. 17/215,134. (9 pages).

\* cited by examiner

*Primary Examiner* — Soo Shin

(57) ABSTRACT

Disclosed herein are methods and systems for determining liveness of a user, comprising analyzing visual content of a screen of a client device used by a user to access an online service, adjusting one or more visual objects displayed on the screen of the client device according to dynamically changing patterns, capturing a sequence of images depicting one or more reflecting surfaces associated with the user viewing the screen while the visual objects are displayed, analyzing the images to identify a reflection of the displayed visual objects in the reflecting surfaces and verifying liveness of the user based on one or more of a plurality of reflection attributes of the identified reflection.

20 Claims, 11 Drawing Sheets

LIVENESS DETECTION BASED ON REFLECTIONS ANALYSIS

RELATED APPLICATIONS

This application is a continuation of U.S. patent application Ser. No. 17/215,134 filed on Mar. 29, 2021. The contents of the above applications are all incorporated by reference as if fully set forth herein in their entirety.

FIELD AND BACKGROUND OF THE INVENTION

The present invention, in some embodiments thereof, relates to determining liveness of a user accessing an online service, and, more specifically, but not exclusively, to determining liveness of a user accessing an online service based on reflections of the user's client device identified in one or more reflecting surfaces associated with the user.

Online services, for example, video conferences, video chats, online resources and/or the like which employ imaging (video) users for one or more goals, for example, communication, authentication and/or the like have become abundant and highly popular in recent time with the advancement of technology, specifically, advanced video protocols, high network availability, increased computing power and more.

Another major contributor to the constantly increasing demand for video based sessions is the fact that many human interactions have been replaced by such video sessions, for example, work sessions, educational sessions, social activities and many more. This trend has significantly expanded under the constraints imposed during the COVID-19 epidemic during which travel and mobility of large segments of the population is highly limited.

However, while the video session may allow for direct, easy and immediate interaction, such video and/or imaging based interactions may be exposed to potential malicious parties which may impersonate as genuine users for one or more malicious goals.

SUMMARY OF THE INVENTION

According to a first aspect of the present invention there is provided a computer implemented method of determining liveness of a user, comprising using one or more processors for:
  Analyzing visual content of a screen of a client device used by a user to access one or more online services.
  Adjusting one or more visual objects displayed on the screen according to one or more dynamically changing patterns.
  Receiving a sequence of images depicting one or more reflecting surfaces associated with the user viewing the screen while the one or more visual objects are displayed.
  Analyzing at least some images of the sequence to identify a reflection of at least part of the one or more displayed visual objects in at least part of the one or more reflecting surfaces.
  Verifying liveness of the user based on one or more of a plurality of reflection attributes of the identified reflection.

According to a second aspect of the present invention there is provided a system for determining liveness of a user, comprising one or more processor configured to execute a code. The code comprising:
  Code instruction to analyze visual content of a screen of a client device used by a user to access one or more online services.
  Code instruction to adjust one or more visual objects displayed on the screen according to one or more dynamically changing patterns.
  Code instruction to receive a sequence of images depicting one or more reflecting surfaces associated with the user viewing the screen while the one or more visual objects are displayed.
  Code instruction to analyze at least some images of the sequence to identify a reflection of at least part of the one or more displayed visual objects in at least part of the at least reflecting surface.
  Code instruction to verify liveness of the user based on one or more of a plurality of reflection attributes of the identified reflection.

According to a third aspect of the present invention there is provided a computer implemented method of determining liveness of a user, comprising using one or more processors for:
  Receiving a sequence of images depicting one or more reflecting surfaces associated with a user using a client device to access one or more online services.
  Analyzing one or more images of the sequence to identify a reflection of at least part of the client device in at least part of the at least one reflecting surfaces.
  Verifying liveness of the user based on one or more of a plurality of reflection attributes of the identified reflection.

According to a fourth aspect of the present invention there is provided a system for determining liveness of a user, comprising one or more processors configured to execute a code. The code comprising:
  Code instruction to receive a sequence of images depicting one or more reflecting surfaces associated with a user using a client device to access one or more online services.
  Code instruction to analyze one or more images of the sequence to identify a reflection of at least part of the client device in at least part of the at least one reflecting surface.
  Code instruction to verify liveness of the user based on one or more of a plurality of reflection attributes of the identified reflection.

In a further implementation form of the first and/or second aspects, the one or more visual objects change over time according to the one or more dynamically changing patterns.

In a further implementation form of the first and/or second aspects, the one or more processors are further configured to adjust randomly the one or more dynamically changing patterns.

In a further implementation form of the first and/or second aspects, the one or more processors are further configured to adjust one or more display parameters of one or more of the visual objects according to one or more of the plurality of reflection attributes of the identified reflection.

In a further implementation form of the first and/or second aspects, the one or more processors are further configured to adjust one or more display parameter of one or more of the visual objects according to one or more illumination conditions identified in an environment of the client device.

In a further implementation form of the first and/or second aspects, the one or more processors are further configured to adjust one or more display parameter of the one or more of the visual objects according to one or more operational parameters of one or more imaging sensors capturing the sequence of images.

In a further implementation form of the first and/or second aspects, the one or more visual objects are members of a group consisting of: a graphical element and/or a text element.

In a further implementation form of the first and/or second aspects, the one or more visual objects are embedded in online content rendered by the client device.

In a further implementation form of the first and/or second aspects, the one or more visual objects are embedded in visual content generated by the client device.

In a further implementation form of the first, second, third and/or fourth aspects, the one or more reflecting surfaces are members of a group consisting of: an eye of the user, a lens of glasses worn by the user, a wearable item worn by the user and/or a reflecting object located in an environment of the user.

In a further implementation form of the first, second, third and/or fourth aspects, the one or more processors are further configured to verify liveness of the user based on one or more of the plurality of reflection attributes of a plurality of reflections identified in a plurality of reflecting surfaces associated with the user by:

Receiving a sequence of images depicting the plurality of reflecting surfaces.

Analyzing at least some images of the sequence to identify one or more of the plurality of reflection attributes of a respective one of the plurality of reflections of the one or more displayed visual objects in a respective one of the plurality of reflecting surfaces.

Correlating between the one or more reflection attributes identified in the plurality of reflections.

Verifying liveness of the user based on the correlation.

In a further implementation form of the first, second, third and/or fourth aspects, the correlation is based on a distance between the plurality of reflecting surfaces and/or the distance between one or more of the plurality of reflecting surfaces and one or more imaging sensors capturing the sequence of images.

In a further implementation form of the first, second, third and/or fourth aspects, the liveness is verified based on analysis of the at least some reflection attributes of the identified reflection according to one or more reflection rules.

In a further implementation form of first, second, third and/or fourth aspects, the liveness is verified based on analysis of the at least some reflection attributes of the identified reflection by one or more trained machine learning (ML) models.

In a further implementation form of the first, second, third and/or fourth aspects, the liveness of the user is verified to support authentication of the user using the client device for one or more of: access one or more secure online services and/or engaging in a video session.

In a further implementation form of the first, second, third and/or fourth aspects, the one or more processors are deployed in the client device.

In a further implementation form of the first, second, third and/or fourth aspects, the one or more processors are deployed in a remote server in communication with the client device via one or more network.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

Figure 1:
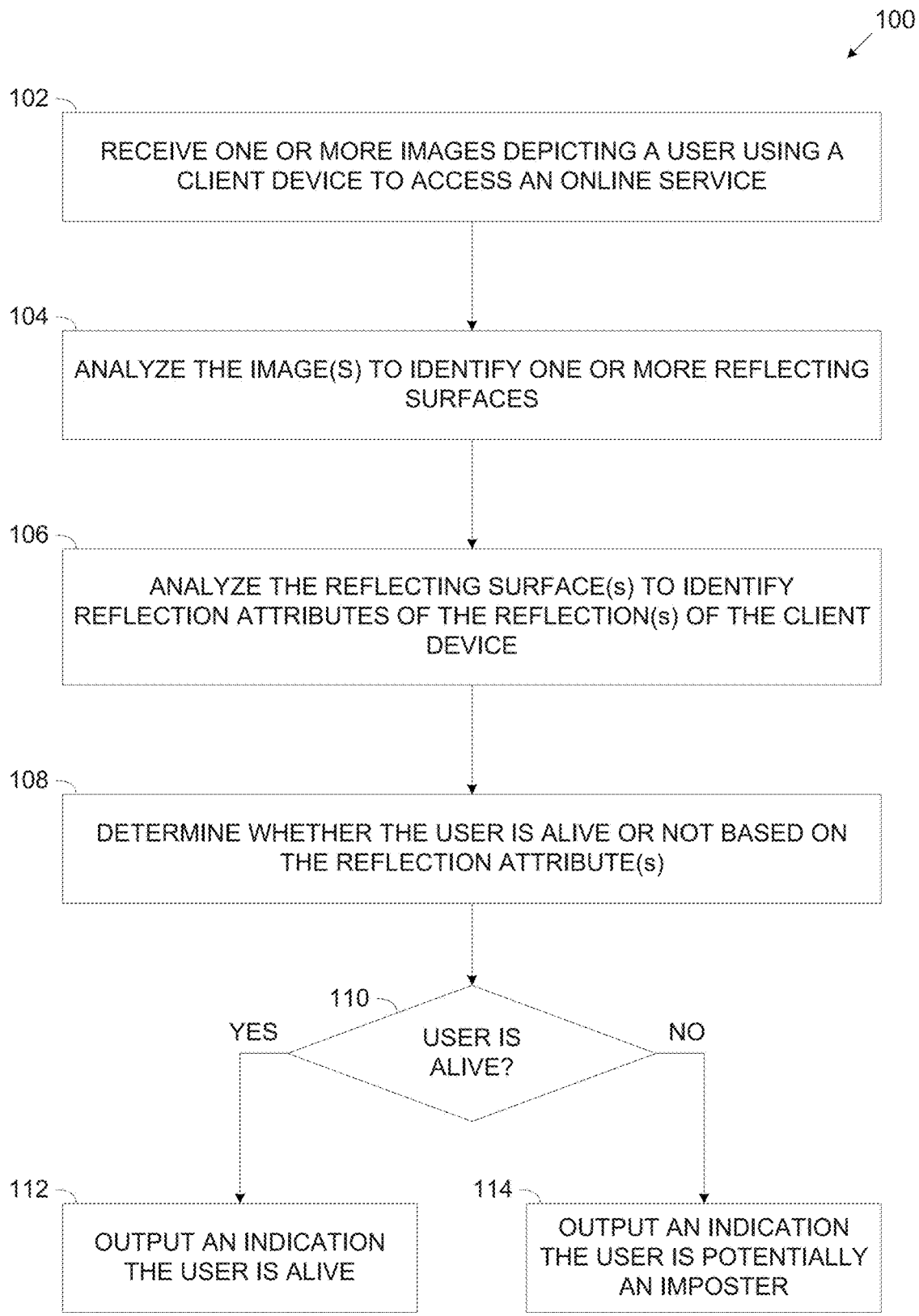
FIG. 1 is a flowchart of a first exemplary process of determining liveness of a user accessing an online service, according to some embodiments of the present invention.

DESCRIPTION OF SPECIFIC EMBODIMENTS
OF THE INVENTION

The present invention, in some embodiments thereof, relates to determining liveness of a user accessing an online service, and, more specifically, but not exclusively, to determining liveness of a user accessing an online service based on reflections of the user's client device identified in one or more reflecting surfaces associated with the user.

According to some embodiments of the present invention, there are provided methods, systems and computer program products for determining and verifying liveness of users using client devices, for example, a server, a desktop computer, a laptop computer, a Smartphone, a tablet, a proprietary client device and/or the like to access one or more online services. Such online service may include, for example, a video session, an online resource (service, network, system, platform, etc.) and/or the like in order to determine and/or estimate whether the user 204 is alive, i.e., a live user or a potential imposter, specifically a synthetic media attempting to impersonate as the user 204, for example, a "deep fake" simulation and/or the like.

Specifically, liveness of a user may be determined and/or verified based on reflection attributes extracted from reflections of the client device and/or visual content displayed by the client device in one or more reflecting surfaces associate with the user, for example, an eye of the user, a lens of glasses of the user, a wearable item worn by the user, a reflecting object in an environment of the user and/or the like.

One or more imaging sensors, for example, a camera and/or the like may be deployed to capture images of the user while accessing the online service(s) using the client device.

The images may be analyzed to identify one or more of the reflecting surfaces associated with the user and the reflection in one or more of the reflecting surfaces may be further analyzed to extract one or more of the reflecting attributes relating to the client device and/or to visual content displayed by the client device, for example, a graphical element, a text element and/or the like.

The reflecting attributes relating to the client device may include, for example, one or more dimension attributes, for example, a length, a width, a depth, a height, an orientation of the client device, a distance of the client device and/or the like, one or more appearance attributes, for example, a color, a texture, presence of visible elements (e.g. sensors, buttons, etc.) and/or the like. The reflecting attributes relating to the visual content, specifically to one or more visual objects displayed on a screen of the client device may include, for example, a dimension, a size, a color, an orientation, a texture, a distance, a proportion and/or the like.

Moreover, one or more of the visual objects may be dynamically adjusted such according to one or more dynamically changing patterns defining adjustment of one or more display parameters of the respective visual objects, for example, a rotation, a rotation speed, a color change, a color change frequency, a size change, a text change, a change of location on the screen and/or the like.

Optionally, one or more of the dynamically changing patterns may be randomly adjusted such that pone or more of the display parameter of one or more of the dynamically adjusted visual objects are changed (adjusted) in a random manner.

Liveness of the user(s) may be thus determined and/or verified by analyzing the reflection attribute(s) extracted from one or more of the reflections of the client device and/or the visual object(s) to determine whether the reflection attribute(s) are typical to human users or whether the reflection attribute(s) may be simulated, duplicated and/or otherwise generated by an impersonator, specifically the synthetic media.

Determining whether the extracted reflection attribute(s) are typical to human users may be done using and/or employing one or more methods, techniques and/or algorithms.

For example, one or more rules may be predefined to indicate whether the extracted reflection attribute(s) are indicative that the user is a genuine real user rather than a potential impersonator. The predefined rule(s) may define for example, a value for one or more reflection attributes which are typical and/or allowable for reflections from a human eye, form real glasses, from real wearable items and/or from real reflecting objects which may be found in the environment of the user. In another example, the predefined rule(s) may define one or more allowable and/or typical deviations and/or distortions in one or more of the reflection attributes which may be caused by one or more parameters of one or more of the reflecting surface(s), for example, an imperfect surface which may distort one or more of the dimension attributes, a partially translucent surface which may alter one or more of the appearance attributes (e.g. brightness, color, etc.) and/or the like.

In another example, one or more trained Machine Learning (ML) models, for example, a neural network, an SVM and/or the like to the received images depicting the reflecting surface(s) reflecting the client device and/or the visual objects to determine and verify the reflection(s) complies with a live user. The trained ML model(s) may learn (create) the reference reflection attributes typical to real world reflecting surfaces and may adjust accordingly their internal structure, weights and/or the like as known in the art.

Optionally, the liveness of the user may be determined based on a plurality of reflections identified in a plurality of reflecting surfaces associated with the user. The reflection attribute(s) extracted from each of the reflections may be correlated with each other to evaluate their compliance with each other. The reflection attribute(s) extracted from the plurality of the reflections may be further verified compared to expected reflection attributes typical to real world reflecting surfaces either defined by one or more of the predefined rules and/or learned by the ML model(s).

Optionally, one or more display parameters of one or more dynamically adjusted visual objects may be further adjusted in real-time according to one or more of the reflection attributes extracted from the images, according to one or more illumination conditions, according to one or more operational parameters of the imaging sensor(s) and/or the like.

Liveness of the user may be thus verified based on the verification that the extracted reflection attribute(s) comply with the expected reflection attributes typical to real world reflecting surfaces either defined by one or more of the predefined rules and/or learned by the ML model(s). While not intended for authenticating users accessing the online services, verifying liveness of the accessing users may be applied to support authentication of the users.

Determining whether users accessing the online services are genuine live users or not based on analysis of the reflection of their client devices and/or visual content displayed by their client devices may present major advantages and benefits.

First, existing authentication methods and systems, for example, face recognition based authentication systems may be limited in their ability to differentiate between real users and synthetic data simulating the users ("deep fake") and may be therefore susceptible and exposed to such deceptions. Applying the liveness verification based on the reflection attributes may therefore significantly increase robustness, reliability and/or security of the existing authentication methods and systems.

Moreover, synthetic data simulating the user ("deep fake") may be limited in its ability and/or capacity to effectively simulate the reflection attributes which may include multiple subtle nuances. It may be therefore difficult and potentially impossible for the synthetically generated media to accurately and/or reliably simulate such real world reflection attributes and/or distort the reflection attributes according to the real world deviations and/or distortions. Even if it was possible for the synthetic media to accurately and reliably simulate the real world reflection attributes, specifically in real-time, it may require extensive computing resources (e.g. processing resources, processing time, storage resources, etc.) which are typically unavailable for such user access applications.

Furthermore, dynamically adjusting the visual object(s) displayed by the client devices such that their reflections and the respective reflection attributes change accordingly may further increase the effort required by the simulation synthetic media to accurately and/or reliably simulate the dynamically changing visual content. Immunity of the liveness verification to the simulation synthetic media may be therefore significantly increased making the liveness verification highly robust even against sophisticated and advanced deep fake simulations.

In addition, dynamically adjusting the visual object(s) in random manner may prevent the simulation synthetic media from learning the dynamically changing pattern used for adjusting the visual objects thus forcing the simulation synthetic media to attempt to simulate the real world reflection attributes in real time which is as stated here in before a difficult resource consuming task which is practically impossible.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of a first exemplary process of determining liveness of a user accessing an online service, according to some embodiments of the present invention.

An exemplary process 100 may be executed to determine liveness of a user in order to determine whether the user is a genuine user or a potential impersonator by analyzing one or more images depicting a user using a client device to access an online service. In particular, liveness of the user may be determined by analyzing the image(s) to identify a reflection of the client device in one or more reflecting surfaces associated with the user, for example, an eye of the user, glasses of the user, a wearable item worn by the user, a reflecting object in an environment of the user and/or the like and verifying compliance of one or more reflection attributes extracted from reflection(s) of the client device in one or more of the associated reflecting surfaces.

Detecting and determining liveness of the user may be primarily directed to detect synthetic media simulating the user's face ("deep fake") which may be applied in attempt to impersonate, specifically imitate and/or simulate as a genuine user. However, the user's liveness detection may be also applied to detect a potential human impersonator (imposter), for example, a person wearing a mask and/or the like attempting to imitate and/or mimic the genuine user.

Figure 2A:
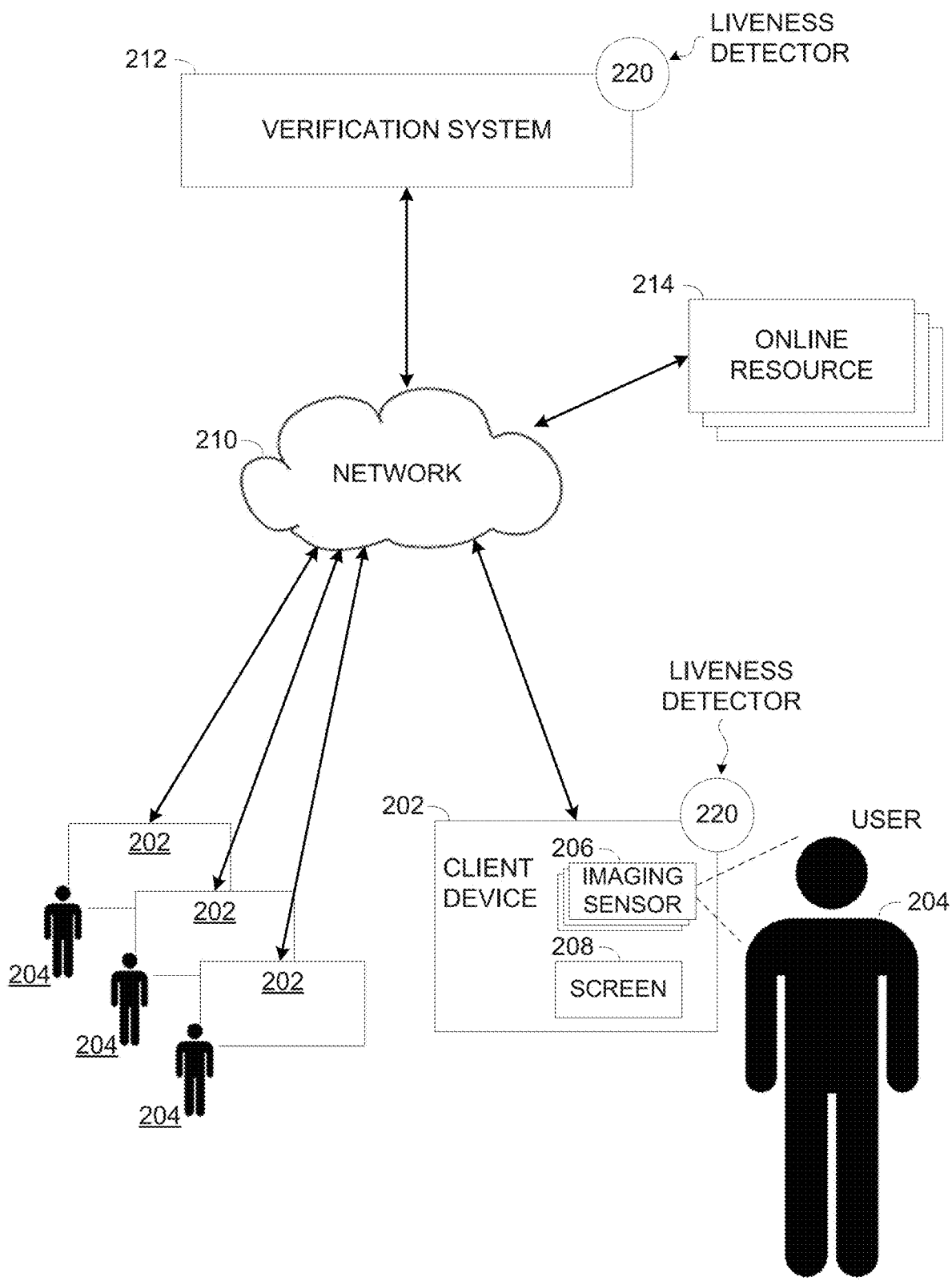
FIG. 2A and FIG. 2B are schematic illustrations of an exemplary system for determining liveness of a user accessing an online service, according to some embodiments of the present invention.
Figure 2B:
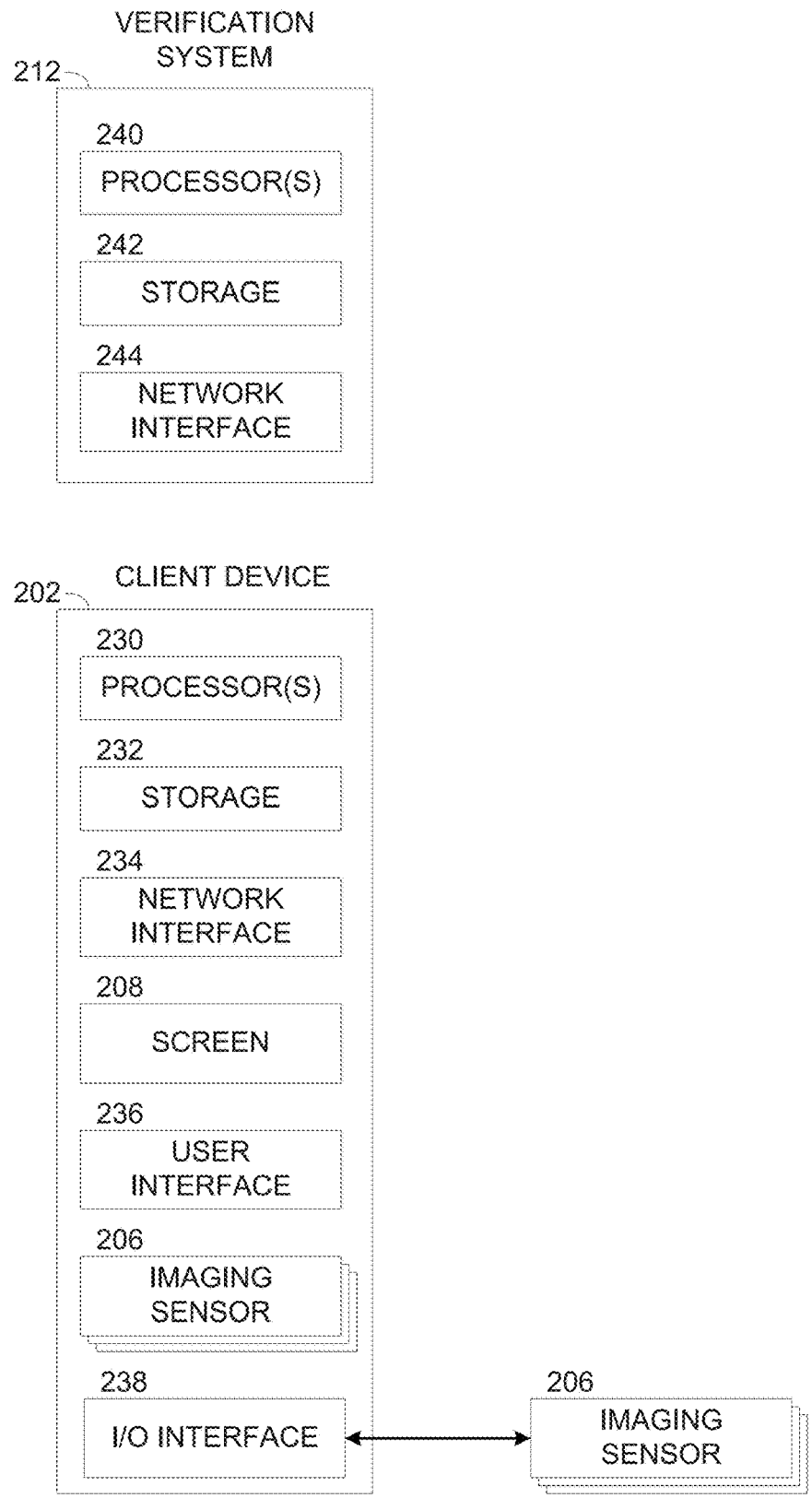

Reference is also made to FIG. 2A and FIG. 2B, which are schematic illustrations of an exemplary system for determining liveness of a user accessing an online service, according to some embodiments of the present invention.

As seen in FIG. 2A, one or more users 204 may use respective client devices 202, for example, a server, a desktop computer, a laptop computer, a Smartphone, a tablet, a proprietary client device and/or the like to access one or more online services, for example, engage in a video session with one or more other user 204 using respective client devices 202, access one or more online resources 214 and/or the like. Such online resources may include, for example, one or more of automated services, systems and/or platforms, for example, a Chatbot, an automated video authentication system, a financial service (e.g. online bank account, etc.), a private network and/or the like.

The user 204 using his client device 202 may access the online service(s) via a network 210 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

Each of the client devices 202 used for accessing the online service(s) may be equipped with one or more imaging sensors 206, for example, a camera, a video camera, a webcam and/or the like configured to capture images of the user 204 while accessing the online service(s). Moreover, the imaging sensor(s) 206 may be configured to capture one or more sequences of consecutive images, for example, a video clip, a sequence of still images and/or the like, at one or more frame rates, for example, 25 frames per second (fps), 30 fps, 50 fps and/or the like.

Each of the client devices 202 may typically further include a screen 208, for example, a display, a touch screen and/or the like to present visual content to the respective user 204 and optionally for interacting with the respective user 204.

One or more of the client devices 202 may execute a user liveness detector 220 configured to execute the process 100 for determining liveness of the respective user 204. Optionally, a verification system 212, for example, a server, a computing node, a cluster of computing nodes and/or the like may be deployed to execute the process 100, for example, by executing the liveness detector 220 in order to determine liveness of one or more of the users 204.

As seen in FIG. 2B, each client device 202 may comprise a processor(s) 230, a storage 232 for storing data and/or code (program store), a network interface 234 for connecting to the network 210, a screen such as the screen 208 for presetting visual content to the user 204 and a user interface 236 for interacting with the user 204. The client device 202 may further include one or more imaging sensors such as the imaging sensors 206. Optionally, the client device 202 may include an Input/Output (I/O) interface 238 for connecting to one or more external and/or attachable devices, for example, one or more imaging sensors such as the imaging sensors 206.

The processor(s) 230, homogenous or heterogeneous, may include one or more processing nodes and/or cores arranged for parallel processing, as clusters and/or as one or more multi core processor(s). The storage 232 may include one or more non-transitory persistent storage devices, for example, a Read Only Memory (ROM), a Flash array, a Solid State Drive (SSD), a hard drive (HDD) and/or the like. The storage 232 may also include one or more volatile devices, for example, a Random Access Memory (RAM) component, a cache and/or the like.

The network interface 234 may include one or more wired and/or wireless network interfaces, for example, a LAN interface, a WLAN interface, a WAN interface, a MAN interface, a cellular interface and/or the like. Via the network interface 234, the client device 202 may communicate with one or more of the other client devices 202 and/or with the remote verification system 212.

The user interface 236 may include one or more Human-Machine Interfaces (HMI) for interacting with the user 204, for example, a keyboard, a touchpad, a pointing device, a touchscreen, a screen, a digital pen, a speaker, an earphone, a microphone and/or the like.

The I/O interface 238 may include one or more wired and/or wireless I/O interfaces, for example, a Universal Serial Bus (USB) port, a WLAN (e.g. Wi-Fi), a serial port, a Bluetooth (BT) interface, a Radio Frequency (RF) interface, an infrared (IR) interface, a Near Field (NF) interface and/or the like for communicating and/or attaching to one or more external devices and/or attachable devices.

As stated herein before, the client device 202 may be communicatively coupled to one or more imaging sensors 206 which may be integrated in the client device 202 and/or attached to the client device 202. For example, assuming the client device 202 is a cellular phone, the cellular phone may include one or more integrated imaging sensors 206, for example, an integrated camera, an integrated video camera and/or the like. In another example, assuming the client device 202 is a desktop computer, the desktop computer may connect to one or more attachable imaging sensors 206, for example, a webcam and/or the like via one or more of the I/O interfaces, for example, the USB and/or the Wi-Fi interfaces.

The processor(s) 230 may execute one or more software modules such as, for example, a process, a script, an application, an agent, a utility, a tool and/or the like each comprising a plurality of program instructions stored in a non-transitory medium (program store) such as the storage 232 and executed by one or more processors such as the processor(s) 230. Optionally, the processor(s) 230 may include and/or be supported by one or more hardware modules (elements) integrated in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 230 may therefore execute one or more functional modules which may be implemented via one or more software modules, one or more of the hardware modules and/or a combination thereof. In particular, the processor(s) 230 may execute the liveness detector 220 for determining liveness of the respective user 204 using the client device 202 to access one or more of the online services.

The verification system 212 may comprise a processor(s) 240 such as the processor(s) 230, a storage 242 for storing data and/or code (program store) and a network interface 244 such as the network interface 234 for connecting to the network 210.

As described herein before, the processor(s) 240, homogenous or heterogeneous, may include one or more processing nodes arranged for parallel processing, as clusters and/or as one or more multi core processor(s). The storage 242 may include one or more non-transitory persistent storage devices, for example, a ROM, a Flash array, an SSD, an HDD and/or the like, as well as one or more volatile devices, for example, a RAM component, a cache and/or the like. The storage 242 may further comprise one or more network storage devices, for example, a storage server, a Network Accessible Storage (NAS), a network drive, a database server and/or the like accessible through the network interface 244.

The processor(s) 240 may execute one or more software modules each comprising a plurality of program instructions stored in a non-transitory medium (program store) such as the storage 242 and executed by one or more processors such as the processor(s) 240. The processor(s) 240 may further utilize one or more hardware modules (elements) integrated in remote verification system 210, for example, a circuit, a component, an IC, an ASIC, an FPGA, a DSP, a GPU, a network processor and/or the like.

The processor(s) 240 may therefore execute one or more functional modules implemented using one or more software modules, one or more of the hardware modules and/or combination thereof, in particular the liveness detector 220 for determining liveness of one or more of the users 204 using their respective client devices 202 to access one or more of the online services.

Optionally, the verification system 212, specifically the liveness detector 220 may be implemented and/or utilized by one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The process 100 which may be executed, for example, by the liveness detector 220 may be executed to determine liveness of one or more of the users 204 using their respective client devices 202 to access one or more of the online services. One or more implementation and/or operation modes may be applied to execute the liveness detector 220, some of which are described herein. This however, should not be construed as limiting since other modes may be apparent to a person skilled in the art.

For example, assuming a first user 204 uses a first client device 202 to engage in a video session with a second user 204 using a second client device 202. In a first exemplary deployment and operation mode, the liveness detector 220 may be executed by the first client device 202 to determine liveness of the second user 204. In another exemplary deployment and operation mode, the user verification engine 220 may be executed by the second client device 202 to determine liveness of the second user 204. Naturally, this later operation mode may be applied in case the second client device 202 is configured to execute the liveness detector 220 in trusted mode such that it may not be adjusted, manipulated, tweaked and/or otherwise altered to falsely verify an impersonator using the second client device 202 as a genuine user. In another exemplary deployment and operation mode, the user liveness detector 220 may be executed by the verification system 212 as a service the first user 204 to verify that the second user 204 is genuine.

In another exemplary deployment and operation mode, assuming a certain user 204 uses his respective client device 202 to access a certain online resource 214, for example, a secure online service such as, for example, a banking account, a private network, a private service and/or the like. In such case the liveness detector 220 may be executed by the verification system 212 which may determine lives of the certain user 204 and may provide the outcome as a service to the accessed online resource.

Optionally, the verification system 212 and/or part thereof is integrated with the online resource 214 such that the liveness detector 220 may be executed by the provider itself of the online resource 214, specifically by a system, platform and/or the like providing and/or associated with the online resource 214 accessed by the certain user 204.

It should be noted that the process 100 is not directed to authenticating an identity of the users 204 but rather to determine liveness of one or more of the users 204 thus determine and/or verifying that the user(s) 204 are genuine users and not impersonators attempting to impersonate as the genuine users 204. However, the liveness determination may naturally be used to support authentication of the users 204.

For brevity, the process 100 is described to determine liveness of a single user 204 accessing one or more using a single client device 202 to access one or more of the online services. This however, should not be construed as limiting since the process 100 may be expanded to determine liveness of a plurality of users 204 using their respective client devices 202 to access the online service(s).

As shown at 102, the process 100 starts with the liveness detector 220 receiving one or more images captured by one or more of the imaging sensors 206 configured to monitor and capture one or more images of a user 204 using a client device 202 to access one or more online services, for example, a video session, an online resource 214 and/or the like.

As there exist multiple implementation, deployment and/or operation modes for executing the liveness detector 220, the liveness detector 220 may receive the images accordingly. To continue the previously presented example, assuming a certain user 204 uses a respective client device 202 to access a certain online service, for example, a secure online resource 214 and further assuming the liveness detector 220 is executed by the respective client device 202. In such case, the liveness detector 220 may receive one or more images from one or more of the imaging sensor(s) 206 coupled to the respective client device 202, for example, integrated in the respective client device 202 and/or attached to the respective client device 202 via one or more of the interfaces available in the I/O interface 238 of the respective client device 202. However, in case the liveness detector 220 is executed remotely by the verification system 212 which may optionally be integrated with the online resource 214 itself, the respective client device 202 may transmit at least some images of one or more sequences of images captured by the imaging sensor(s) 206 to the remote liveness detector 220 via the network 210.

In another example, assuming a first user 204 uses a first client device 202 to access a certain online service(s), for example, a video session with a second user 204 using a second client device 202 where the second wants to determine whether the first user 204 is alive to support authenticating and/or verifying the first user 204. In case the liveness detector 220 is executed by the first client device 202, the liveness detector 220 may obtain one or more sequences of consecutive images of the first user 204 from one or more imaging sensors 206 associated with the first client device 202 which are deployed to depict the first user 204. In case the liveness detector 220 is executed by the second client device 202, the liveness detector 220 may receive, from the first client device 202 via the network 210, at least some of the images of one or more of the images sequences captured by one or more of the imaging sensor(s) 206 associated with the first client device 202.

As shown at 104, the liveness detector 220 may analyze one or more of the images depicting the user 204 to identify one or more reflecting surfaces associated with the user 204 which are characterized by relatively high reflectance such that these reflecting surfaces may reflect an image of one or more items and/or objects located in the environment of the user 204, in particular, located in front of the user 204, i.e., faced by the user 204.

The reflecting surfaces may include, for example, one or more areas (sections) of one or more of the eyes of the user 204 specifically, a lens of the eye, a cornea and/or the like. In another example, one or more of the reflecting surface(s) may further include one or more areas (sections) of one or more lenses of glasses worn by the user 204. In another example, one or more of the reflecting surface(s) may include one or more areas of one or more wearable items worn by the user 204, for example, a metal necklace reflecting light, a light reflecting plastic covered name tag and/or the like. In another example, one or more of the reflecting surface(s) may include one or more areas of one or more reflecting objects located in the environment of the user 204 which may reflect light, for example, a glass window, a computer monitor, a mirror and/or the like.

The liveness detector 220 may apply or use one or more image analysis technologies, methods, tools and/or algorithms as known in the art for analyzing the images, for example, computer vision, image processing, ML classification and/or the like.

As shown at 106, the liveness detector 220 may analyze the image(s) depicting the user 204, specifically analyze one or more sections the image(s) which contain the reflecting surface(s) to identify a reflection in one or more of the reflecting surface(s)

The liveness detector 220 may further analyze the reflection(s) identified in the image section(s) depicting the reflecting surface(s) to identify and extract one or more of a plurality of reflection attributes of each of the reflection(s), for example, an orientation, a rotation angle, a reflected object, a color of a reflected object, a texture of a reflected object, a dimension of a reflected object, a distance of a reflected object, a proportion of a reflected object and/or the like.

In particular, since the user 204 may use the client device 202 to access the online service, the user may typically face the client device 202. As such, at least part of the client device 202, for example, an outline of the client device 202, a case of the client device 202 and/or part thereof, the screen 208 of the client device 202 and/or part thereof and/or the like may be reflected by one or more of the reflecting surface(s).

For example, analyzing the image(s), specifically the reflection(s) identified in the image section(s) depicting the reflecting surface(s), the liveness detector 220 may identify one or more of the reflection attributes relating to the client device 202 used by the user 204, for example, an outline of the client device 202, a color of the client device 202, a case of the client device 202, an orientation of the client device 202, a dimension relating to the client device 202 and/or the like.

In another example, analyzing the image(s), specifically the reflection(s) identified in the image section(s) depicting the reflecting surface(s), the liveness detector 220 may identify one or more of the reflection attributes relating to visual content displayed on the screen 208 of the client device. The liveness detector 220 may analyze the reflected visual content to identify one or more visual objects, for example, an icon, a symbol, a logo, a text, a picture, a pattern and/or the like and further extract one or more reflection attributes relating to the visual object(s), for example, a shape, a color, a texture, a size, a pattern and/or the like.

Figure 3:
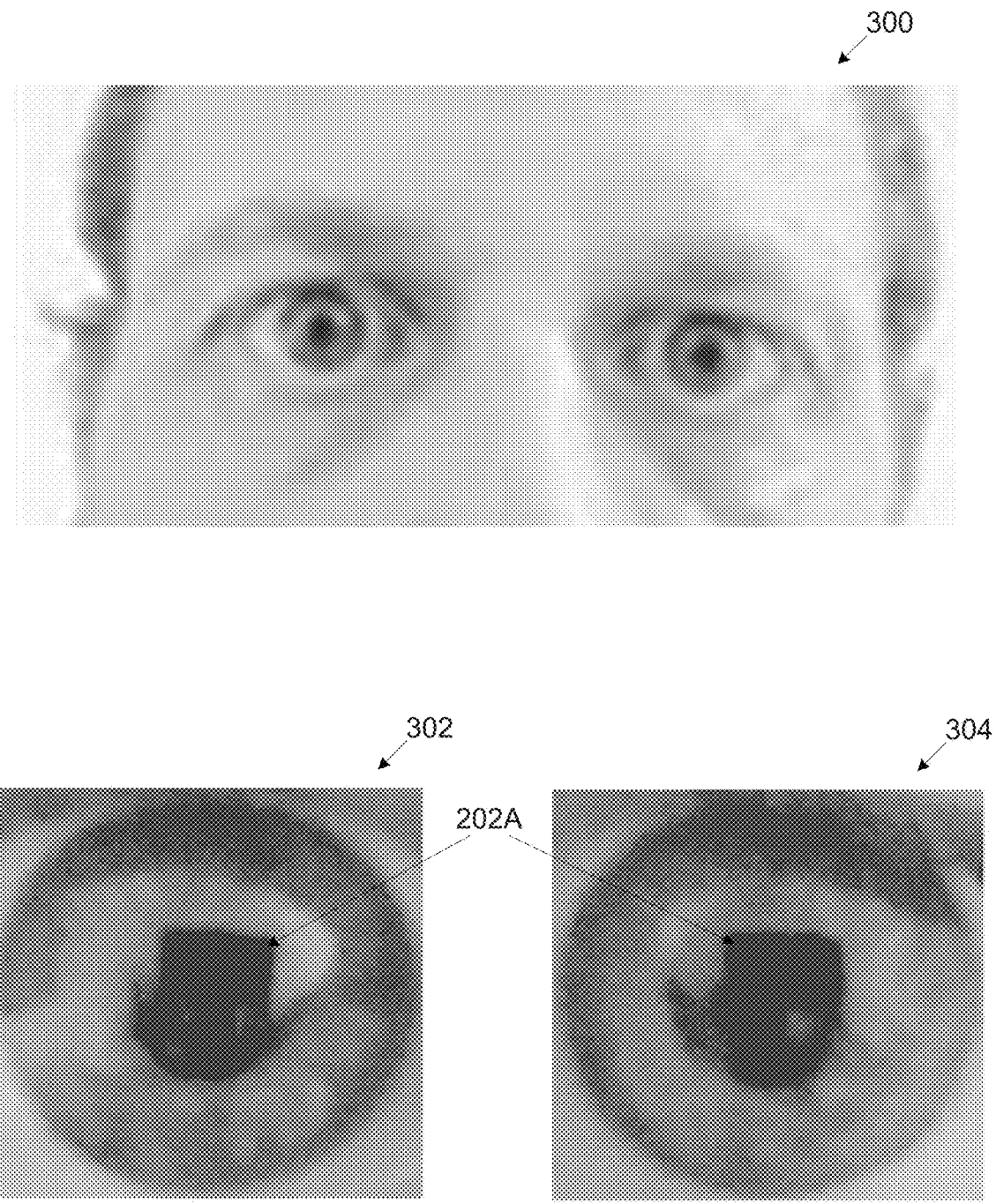
FIG. 3 presents captures of exemplary reflections of a client device used by a user which are analyzed to determine liveness of the user, according to some embodiments of the present invention.

Reference is now made to FIG. 3, which presents captures of exemplary reflections of a client device used by a user which are analyzed to determine liveness of the user, according to some embodiments of the present invention.

An image capture 300 depicts the right and left eyes of an exemplary user such as the user 204 using a client device 202A such as the client device 202, for example, a smartphone, to access one or more of the online services. An image capture 302 which is an enlarged zoom-in view of the right eye seen in image capture 300 and an image capture 304 which is an enlarged zoom-in view of the left eye seen in image capture 300 each shows a reflection of at least part of the client device 202A used by the user 204.

A liveness detector such as the liveness detector 220 may analyze the reflection of the client device 202A in one or more of the images 302 and/or 304 to identify and extract one or more of the plurality of reflection attributes relating to the client device 202A. For example, the liveness detector 220 may extract an orientation of the client device 202A, for example, portrait, landscape, mirror view and/or the like. In another example, the liveness detector 220 may extract a color of the client device 202A. In another example, the liveness detector 220 may extract one or more dimensions of the client device 202A, for example, a length, a width, a distance between visual elements of the client device 202A, for example, between buttons, sensors and/or the like. In another example, the liveness detector 220 may extract, derive and/or compute a distance of the client device 202A from the imaging sensor 206 which captured the image 302 and/or 304.

Figure 4:
FIG. 4 presents captures of exemplary reflections of a client device used by a user which are analyzed to determine liveness of the user, according to some embodiments of the present invention.
Figure 4:
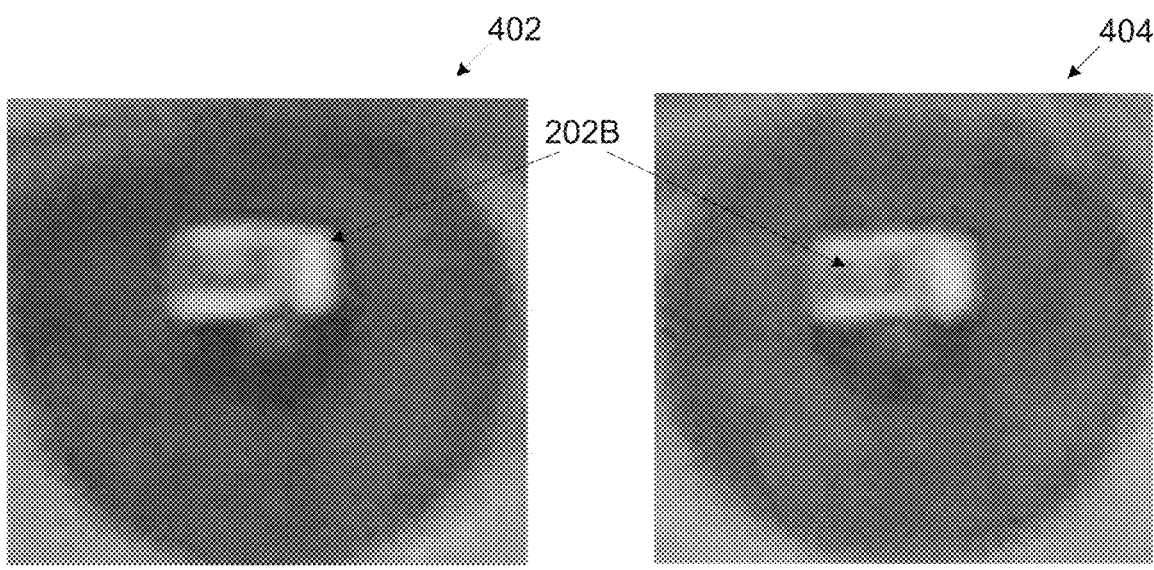

Reference is also made to FIG. 4, which presents captures of exemplary reflections of a client device used by a user which are analyzed to determine liveness of the user, according to some embodiments of the present invention.

An image capture 400 depicts the right and left eyes of an exemplary user such as the user 204 using a client device 202B such as the client device 202, for example, a desktop computer, to access one or more of the online services. An image capture 402 which is an enlarged zoom-in view of the right eye seen in image capture 400 and an image capture 404 which is an enlarged zoom-in view of the left eye seen in image capture 400 each shows a reflection of at least part of the client device 202B used by the user 204.

A liveness detector such as the liveness detector 220 may analyze the reflection of the client device 202B in one or more of the images 402 and/or 404 to identify and extract one or more of the plurality of reflection attributes relating to the client device 202A. In particular, the liveness detector 220 may analyze the reflection of the client device 202B in one or more of the images 402 and/or 404 to identify visual content, for example, one or more visual objects displayed on a screen such as the screen 208 of the client device 202B. The liveness detector 220 may then extract one or more reflection attributes relating to the identified visual object(s), for example, a white pattern covering most of the screen 208.

Figure 5:
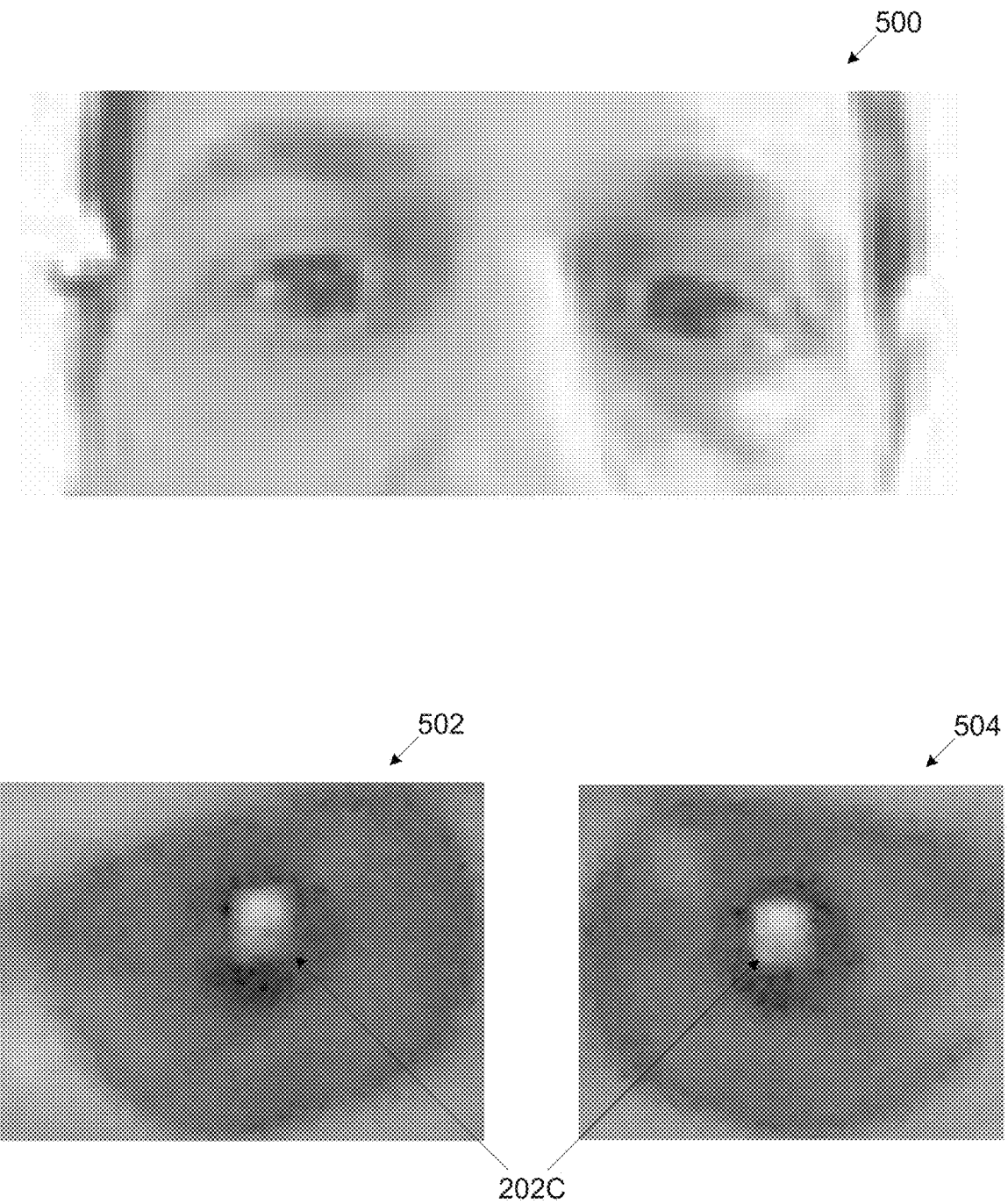
FIG. 5 presents captures of exemplary reflections of a client device used by a user which are analyzed to determine liveness of the user, according to some embodiments of the present invention.

Reference is also made to FIG. 5, which presents captures of exemplary reflections of a client device used by a user which are analyzed to determine liveness of the user, according to some embodiments of the present invention.

An image capture 500 depicts the right and left eyes of an exemplary user such as the user 204 using a client device 202C such as the client device 202, for example, a cellular phone, to access one or more of the online services. An image capture 502 which is an enlarged zoom-in view of the right eye seen in image capture 500 and an image capture 504 which is an enlarged zoom-in view of the left eye seen in image capture 500 each shows a reflection of at least part of the client device 202B used by the user 204.

A liveness detector such as the liveness detector 220 may analyze the reflection of the client device 202C in one or more of the images 502 and/or 504 to identify and extract one or more of the plurality of reflection attributes relating to the client device 202A, specifically reflection attributes relating to the identified visual content, for example, visual object(s) displayed by a screen such as the screen 208 of the client device 202C, for example, a white colored rectangle shaped object.

Figure 6:
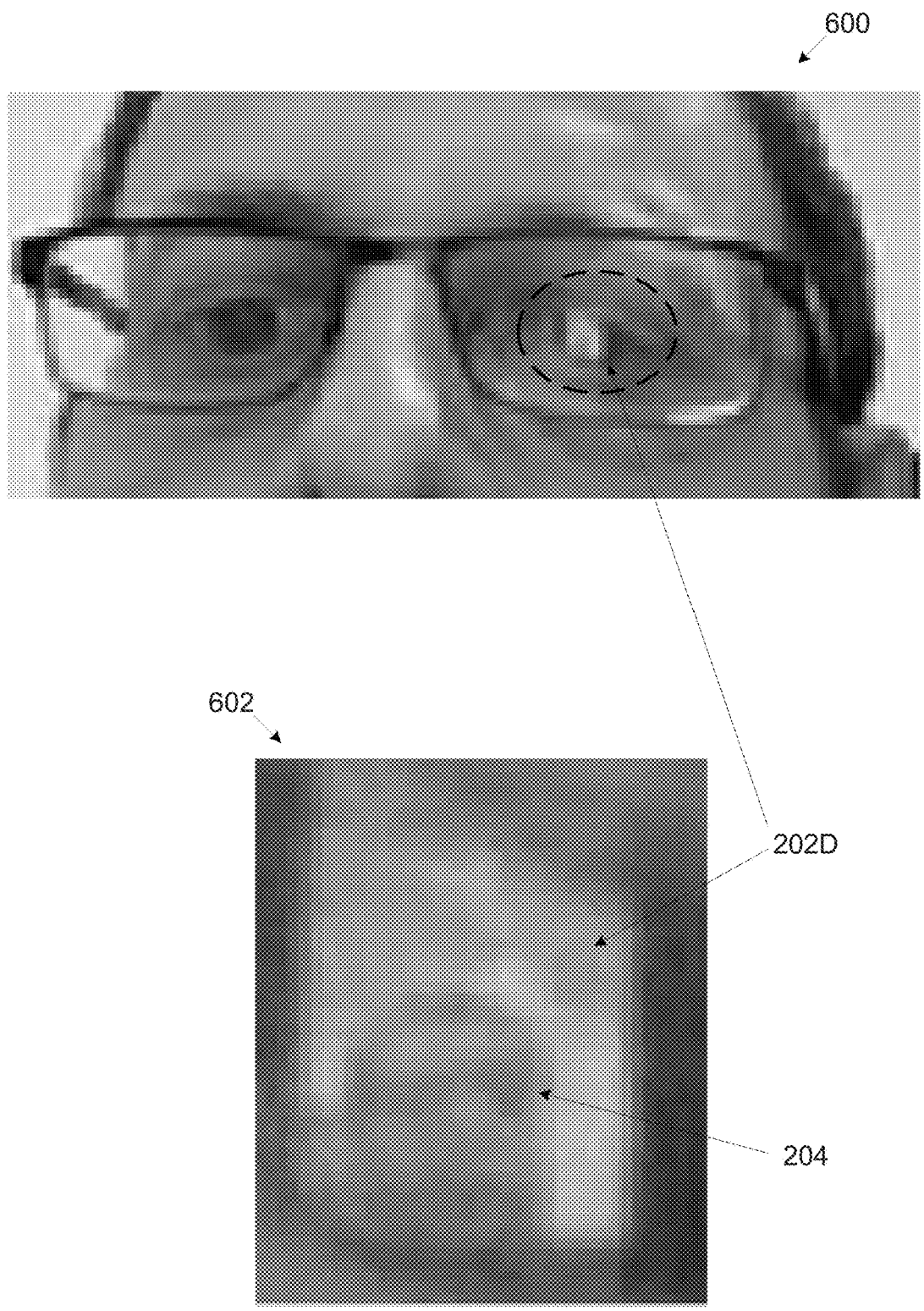
FIG. 6 presents captures of exemplary reflections of a client device used by a user which are analyzed to determine liveness of the user, according to some embodiments of the present invention.

Reference is also made to FIG. 6, which presents captures of exemplary reflections of a client device used by a user which are analyzed to determine liveness of the user, according to some embodiments of the present invention;

An image capture 600 depicts an exemplary user such as the user 204 wearing glasses which is using a client device 202D such as the client device 202, for example, a smartphone, to access one or more of the online services. An image capture 602 which is an enlarged zoom-in view of the left lens of the glasses of the user 204 seen in image capture 600 shows a reflection of at least part of the client device 202D used by the user 204.

A liveness detector such as the liveness detector 220 may analyze the reflection of the client device 202D in the images 602 to identify and extract one or more of the plurality of reflection attributes relating to the client device 202A, specifically reflection attributes relating to the identified visual content, for example, visual object(s) displayed by a screen such as the screen 208 of the client device 202D, for example, an image of the user 204 himself as captured by one or more of the imaging sensor(s) 206 of the client device 202D.

Reference is made once again to FIG. 1.

As shown at 108, based on the reflection attribute(s) extracted from the reflection(s) identified in one or more of the reflecting surface, the liveness detector 220 may verify liveness of the user 204 in order to determine and/or estimate whether the user 204 is alive, i.e., a live user or a potential imposter, specifically a synthetic media attempting to impersonate as the user 204, for example, a "deep fake" simulation and/or the like.

The liveness detector 220 may apply one or more methods, techniques and/or algorithms to analyze the extracted reflection attribute(s) in order to determine and/or verify liveness of the user 204 by verifying that the extracted reflection attribute(s) may indicate that the user 204 is a genuine live user and not a potential impersonator.

For example, the liveness detector 220 may analyze the extracted reflection attribute(s) with respect to one or more rules predefined for computing and/or determining whether the reflection attribute(s) indicate that the user 204 is a genuinely live user. For example, one or more of the rules may define a value for one or more dimension attributes of the client device 202, for example, a width, a height, a depth and/or the like which are typical and/or allowable for reflections from a human eye, form real glasses, from real wearable items and/or from real reflecting objects which may be found in the environment of the user 204. In another example, one or more of the rules may define a value for one or more appearance attributes of the client device 202, for example, a color, a texture, a sensor and/or the like which may be which may be compared to respective appearance attributes identified in the reflection of the client device 202 in one or more of the reflecting surface(s). In another example, the predefined rules may define one or more allowable and/or typical deviations and/or distortions in one or more of the reflection attributes which may be caused by one or more parameters of one or more of the reflecting surface(s), for example, an imperfect surface which may distort one or more of the dimension attributes, a partially translucent surface which may alter one or more of the appearance attributes (e.g. brightness, color, etc.) and/or the like.

Moreover, one or more of the rules defined for analyzing the reflection attributes to determine their compliance with a live user may be derived from one or more rule based models, for example, models representing the client device 202 and/or content displayed on the screen 208 of the client device 202. Such models may include, for example, one or more structural models of the client device 202, for example, a three dimension (3D) model of the client device 202 expressing dimensions, appearance attributes and/or the like of the client device 202. In another example, the models of the client device 202 may include one or more visual content models expressing visual content displayed on the screen 208 of the client device 202. Based on these models, the liveness detector 220 may analyze the extracted reflection attribute(s) and evaluate their compliance with respective attributes extracted from the models representing the client device 202 and/or the displayed visual content.

In another example, the liveness detector 220 may apply one or more trained ML models, for example, a neural network, an SVM and/or the like to the received images depicting the reflecting surface(s) reflecting at least part of the client device 202 to determine and verify the reflection (s) complies with a live user. The ML model(s) may be trained with training datasets expressing a plurality of reflections of client devices 202 in one or more of the reflecting surfaces associated with one or more users 204. Specifically, the ML model(s) may be trained with a plurality of images depicting the reflections of the client devices 202 such that the during the training the ML model(s) may extract from the images a plurality of reflection attributes which are defined as valid, genuine and/or legitimate for the respective client devices 202 and may be therefore regraded as reference reflection attributes. The ML model(s) may thus learn (create) the reference reflection attributes and may adjust accordingly their internal structure, weights and/or the like as known in the art to reflect one or more of the extracted reference reflection attributes typical to one or more of the client devices 202.

The ML model(s) trained with the training samples (images) depicting the reflections of client devices 202 in the reflecting surfaces which may have different parameters may further learn the deviations and/or distortions typical to these reflecting surfaces due to their parameters. The ML model(s) may therefore adjust their structure and/or weights accordingly to compensate for the typical deviations and/or distortions. Moreover, the ML model(s) may optionally further evolve after deployment to further adjust and learn the deviations and/or distortions typical to the one or more specific reflecting surfaces associated with the specific user 204.

Optionally, the liveness detector 220 determines the liveness of the user 204 to verify the user 204 is alive or determine that the user 204 is a potential impersonator based on one or more of the plurality of reflection attributes extracted from a plurality of reflections identified in a plurality of reflecting surfaces associated with the user 204.

The liveness detector 220 may analyze one or more of the received images to identify a plurality of reflecting surfaces associated with the user 204, for example, two eyes, two eyes and a glasses lens, two glasses lenses and a metal necklace and/or the like. The liveness detector 220 may further analyze the plurality of reflecting surfaces to identify a plurality of reflections of at least part of the client device 202 each in a respective one of the plurality of reflecting surfaces and may extract one or more reflection attributes from each of the plurality of reflections.

The liveness detector 220 may correlate between the reflection attribute(s) identified (extracted) in the plurality of reflections and may determine and/or verify liveness of the user 204 based on the correlation. For example, the liveness detector 220 may compute one or more dimension attributes of the client device 202, for example, the width, the height and/or the like in each of at least some of the reflections. The liveness detector 220 may then correlate and compare between the dimension attribute(s) computed for each of the reflections to verify that the dimension attributes are compliant (equal) with each other. In another example, the liveness detector 220 may extract one or more appearance attributes of the client device 202, for example, the color, the texture and/or the like from each of at least some of the reflections. The liveness detector 220 may then correlate and compare between the appearance attribute(s) extracted from each of the reflections to verify that they comply (match) with each other.

The liveness detector 220 may correlate between the reflection attribute(s) extracted from the plurality of reflections in the plurality of reflecting surfaces based on a distance between the plurality of reflecting surfaces and/or the distance between one or more of the plurality of reflecting surfaces and one or more of the imaging sensor(s) 206 capturing the sequence of images. To this end the liveness detector 220 may apply one or more algebraic, geometric and/or trigonometric calculations as known in the art for computing differences between the correlated reflection attribute(s), for example, dimension attributes extracted from the plurality of reflections in the plurality of reflecting surfaces.

The liveness detector 220 may further determine and verify liveness of the user 204 based on correlation between the reflection attribute(s) extracted from one or more of the plurality of reflections and further with respect to respective expected reflection attribute(s). To this end the liveness detector 220 may apply the rule based approach and/or the ML model(s) method. For example, assuming the liveness detector 220 computes one or more of the dimension attributes of the client device 202, for example, the width, the height and/or the like in each of at least some of the reflections. The liveness detector 220 may further compare the dimension attribute(s) computed based on each of the reflections to a value of the respective dimension(s) predefined by one or more of the rules and/or the rule based models. In another example, the liveness detector 220 may apply one or more of the ML models to the images of the plurality of reflecting surfaces reflecting the client devices 202 to determine liveness of the user 204.

The liveness detector 220 may therefore determine liveness of the user 204, specifically verify that the user 204 is a live user or determine that the user 204 is a potential impersonator by analyzing the reflection attribute(s) extracted from the image(s) of the reflection of the client device 202 in one or more of the reflecting surface(s) associated with the user 204 compared to expected reflection attribute(s), either predefined by the rules and/or learned by the ML model(s).

Based on the analysis of the reflection(s) and the extracted reflection attributes, the liveness detector 220 may further compute a liveness score (value) for the user 204. The liveness score may indicate, for example, a grade (e.g., in a range of zero to one) of the liveness of the user 204 as estimated by the liveness detector 220. In another example, the liveness score may indicate may indicate, a certainty, a probability and/or an accuracy of the liveness verification estimated by the liveness detector 220. The liveness score may be later taken into account for further verifying and/or authenticating the user 204 by one or more authentication systems, typically coupled with other detectors, indicators and/or sub-systems.

Optionally, when analyzing the extracted reflection attribute(s), the liveness detector 220 may apply one or comparison and matching methods, techniques and/or modes. For example, the liveness detector 220 may apply a strict comparison mode such that even a small deviation(s) of the extracted reflection attribute(s) compared to the expected reflection attribute(s) may be unacceptable and the liveness detector 220 may therefore determine that the user 204 is not a live user but rather may be a potential impersonator. Such operation mode may be desirable for high security, high privacy and/or sensitive online services accessed by the user 204. In another example, the user liveness detector 220 may apply a looser comparison mode in which lower deviation thresholds may be applied such that some deviations of the extracted reflection attribute(s) compared to the expected reflection attribute(s) may be acceptable and regarded as compliant, i.e., the user 204 is determined and verified to be a genuinely live user.

As shown at 110, which is a conditional step, in case the liveness detector 220 determines and/or verifies that the user 204 is a genuine live user, the process 100 may branch to 112. However, in case the liveness detector 220 determines that the user 204 may be a potential impersonator, the process 100 may branch to 114.

Optionally in case the liveness detector 220 computes the liveness score for the use 204, the process 100 may branch to 112 in case the liveness score exceeds a certain threshold value while in case the liveness score does not exceed the certain threshold value, the process 100 may branch to 114. The certain threshold which may be predefined and/or dynamically adjusted may be set in the range of the liveness score (e.g. "0" to "1"), for example, 0.75, 0.85, 095 and/or the like.

As shown at 112, since the user 204 is determined to be a live user, the liveness detector 220 may output an indication accordingly indicating that the user 204 is estimated to be a genuine live user. Optionally, in case it computed the liveness score, the liveness detector 220 may further output the liveness score.

As shown at 114, since the liveness detector 220 failed to verify the user 204 as a live user but rather determines that the user 204 may be a potential impersonator, the liveness detector 220 may output an indication accordingly indicating that the user 204 is estimated to be an impersonator. Optionally, in case it computed the liveness score, the liveness detector 220 may further output the liveness score.

While verifying liveness of the user 204 is not directed to authenticate the user 204, the indication of whether the user 204 is verified to be a genuine live user or not, i.e., estimated to be an impersonator may be used to support authentication of the user 204 accessing the online service(s), for example, engaging in a video session, accessing an online resource and/or the like. For example, one or more authentication means, for example, methods, systems, and/or provisions may be based on face recognition and verification. While able to authenticate the user 204 based on his facial patterns and features, such authentication means may be susceptible to deception by "deep fake" synthetic media simulating the user 204. Applying the liveness verification may therefore complement the authentication means by ensuring that the user 204 is a genuine live user or fail the authentication in case the users is determined to be a potential impersonator.

Moreover, in case the liveness score is received from the liveness detector 220, the authentication means may use, evaluate and/or analyze the liveness score typically coupled with other authentication detectors, indicators and/or sub-systems (e.g. password, code, biometric signatures, etc.) to verify and/or authenticate the user 204.

The indication of whether the user 204 is a genuine live user or not (impersonator) may be outputted, for example, transmitted, delivered and/or the like depending on the implementation, operations and/or deployment mode of the liveness detector 220. For example, assuming the liveness detector 220 is executed by the first client device 202 used by the first user 204 to determine whether the second user 204 is a live user or not. In such case, the liveness detector 220 may output the liveness notification to the first user 204 via one or more user interfaces available by the user interface 236 of the first client device 202. In another example, assuming the liveness detector 220 is executed by the verification system 212 to determine and verify liveness of a certain user 204 accessing a certain online resource 214. In such case, the liveness detector 220 may output the liveness notification to the online resource 214 via the network 210. In case the verification system 212 is integrated with the certain online resource 214, the liveness detector 220 may output the liveness notification to one or more modules controlling access to the online resource 214.

According to some embodiments of the present invention, liveness of the users 204 may be verified and/or determined according to a reflection(s) of dynamically adjusted visual content displayed by the screen 208 of the client device 202 and reflected in one or more of the reflecting surfaces associated with the user 204, in particular dynamic visual content.

Figure 7:
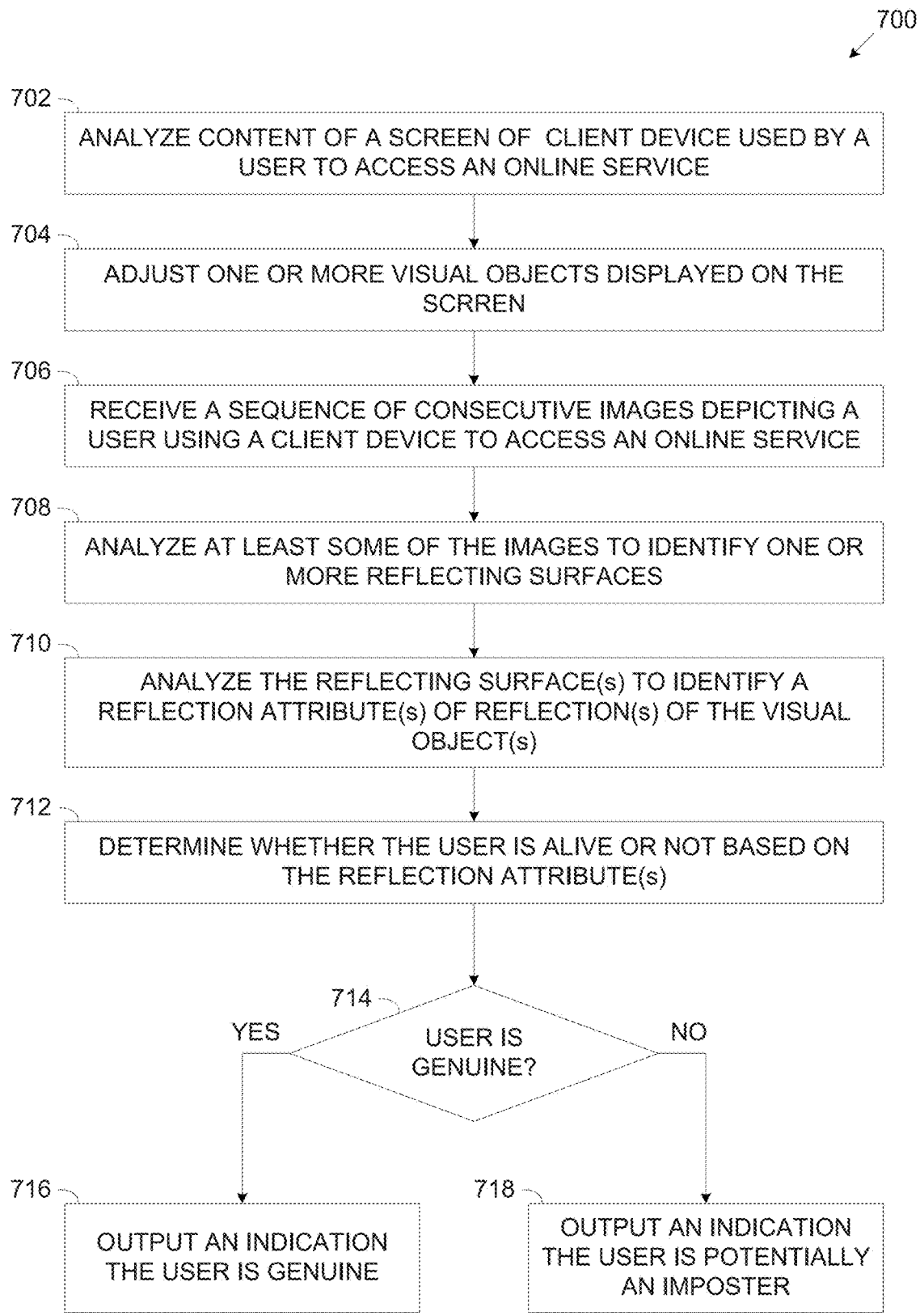
FIG. 7 is a flowchart of a second exemplary process of determining liveness of a user accessing an online service, according to some embodiments of the present invention.

Reference is now made to FIG. 7, which is a flowchart of a second exemplary process of determining liveness of a user accessing an online service, according to some embodiments of the present invention.

An exemplary process 700 may be executed by a liveness detector such as the liveness detector 220 to determine liveness of the user in order to determine whether the user is a genuine user or a potential impersonator by analyze a plurality of images, specifically a sequence of consecutive images depicting a user such as the user 204 using a client device such as the client device 202 to access an online service. Specifically, liveness of the user 204 may be determined by analyzing the images to identify one or more reflecting surfaces associated with the user 204 and verifying compliance of one or more reflection attributes extracted from reflection(s) of visual content displayed by a screen such as the screen 208 of the client device 202 in one or more of the associated reflecting surfaces, in particular dynamically adjusted visual content.

As evident, the process 700 employs similar concepts and actions as the process 100, specifically with respect to analyzing the images depicting the user 204 while using the client device 202 to access the online service(s), extracting reflection attributes from reflections in the reflecting surface(s) associated with the user 204 and determining and/or verifying liveness of the user 204 based on the extracted reflection attributes. However, while in the process 100 the extracted reflection features relate to reflections of the client device 202 itself, in the process 700, the extracted reflection features relate to reflections of one or more visual objects displayed on the screen 208 which are dynamically adjusted such that they change over time.

For brevity, the process 700 is described to determine liveness of a single user 204 accessing one or more using a single client device 202 to access one or more of the online services. This however, should not be construed as limiting since the process 700 may be expanded to determine liveness of a plurality of users 204 using their respective client devices 202 to access the online service(s).

As described for the process 100, the process 700 executed, for example, by the liveness detector 220 may be executed by one or more of the client devices 202 used by respective users 2045 and/or by a verification system such as the verification system 212.

As shown at 702, the process 100 starts with the liveness detector 220 analyzing the visual content displayed by the screen 208 of the client device 202 used by the user 204 to access one or more of the online services, for example, the video session, an online resource such as the online resource 214 and/or the like.

The visual content displayed by the screen 208 may include one or more visual objects displayed, for example, a graphical element such as, for example, an icon, a symbol, a logo, a picture, a pattern and/or the like and/or a text element.

One or more of the visual objects may be embedded in online content, for example, a webpage, a mobile application and/or the like which are rendered by the client device 202, for example, using one or more applications such as, for example, web browser and displayed on the screen 208. However, one or more of the visual objects displayed on the screen 208 may be embedded in visual content generated by the client device 202 itself.

As shown at 704, the liveness detector 220 may adjust in real-time the visual content displayed by the screen 208, for example, adjust one or more visual objects displayed by the screen 208 according to one or more dynamically changing patterns such that the visual object(s) changes over time according to one or more display parameters defined by the dynamically changing pattern.

The dynamically changing pattern(s) applied by the liveness detector 220 may define adjustment of one or more display parameters of the respective visual object(s), for example, a color, a shape, a size, a transformation (e.g., rotation, flip, displacement, etc.), a textual content, a textual format (e.g., bold, italic, font, etc.), a location on the screen 208 and/or the like. For example, assuming a certain visual object dynamically adjusted by the liveness detector 220 comprises a triangle like shape, the liveness detector 220 may apply one or more dynamically changing pattern to adjust one or more attributes of the triangle over time, for example, change a location on the screen 208 where the triangle is displayed, change a color of the triangle, change one or more dimensions of the triangle (e.g. height, length, etc.) and/or the like.

The visual object(s) adjusted by the liveness detector 220 may include, for example, one or more additional visual objects added by the liveness detector 220 to the visual content displayed by the screen 208. In another example, the visual object(s) adjusted by the liveness detector 220 may include one or more visual objects already displayed on the screen 208.

Typically, the liveness detector 220 may adjust the screen 208 by interacting with one or more software modules controlling the screen 208, for example, a driver, a display application and/or the like using one or more Application Programing Interface (API) functions, routines, system calls and/or the like. However, in some implementations the liveness detector 220 may directly interact with the screen 208, or example, via some Hardware Software Interfaces (HSI) to adjust the visual content, specifically one or more of the visual object(s) displayed by the screen 208.

Optionally, the liveness detector 220 randomly adjusts one or more of the dynamically changing patterns such that the respective visual object(s) is adjusted accordingly in a random manner. The liveness detector 220 may randomly adjust one or more of the dynamically changing patterns in the temporal domain such that one or more of the adjusted visual objects may be adjusted, for example, at random times, on random time intervals and/or the like. In another example, the liveness detector 220 may randomly adjust one or more of the dynamically changing patterns in the spatial domain such that one or more of the adjusted visual objects may be relocating at randomly selected locations, areas and/or sections of the screen 208. In another example, the liveness detector 220 may define one or more of the dynamically changing patterns to randomly adjust one or more appearance attributes of one or more of the adjusted visual objects, for example, a color, a shape, an orientation, a transformation, a brightness and/or the like.

As shown at 706, the liveness detector 220 may receive one or more sequences of consecutive images captured by one or more imaging sensors such as the imaging sensor 206 configured to monitor and capture images of the user 204 using the client device 202 to access one or more of the online services.

Moreover, each of the images may be associated with a timestamp indicating a time of when the respective image was captured. The timestamp may be assigned by one or more of the imaging sensor(s) 206, by the liveness detector 220 and/or by one or more other functional modules configured to assign the timestamps.

As shown at 708, the liveness detector 220 may analyze at least some of the consecutive images depicting the user 204 to identify one or more of the reflecting surfaces associated with the user 204, for example, one or more areas (sections) of one or more of the eyes of the user 204 (e.g. lens, cornea, etc.), one or more areas (sections) of one or more lenses of glasses worn by the user 204, one or more areas of one or more wearable items worn by the user 204 (e.g. metal necklace, plastic name tag, etc.), one or more areas of one or more reflecting objects located in the environment of the user 204 (e.g., glass window, computer monitor, mirror, etc.) and/or the like As described herein before, the liveness detector 220 may apply or use one or more of the image analysis technologies, methods, tools and/or algorithms as known in the art for analyzing the images.

Optionally, the liveness detector 220 may adjust one or more of the display parameters of one or more of the dynamically adjusted visual objects according to one or more of a plurality of reflection attributes extracted from one or more of the reflections of the visual object(s) identified in one or more of the reflecting surfaces associated with the user 204. For example, assuming a certain dynamically changing pattern defines adjusting one or more display parameters, for example, a color of a certain visual object, for example, a circular shape such that the circular shape changes its color between five different colors in a certain frequency. Further assuming that while analyzing the images depicting one or more reflections of the circular shape in one or more reflecting surfaces associated with the user 204, the liveness detector 220 fails to properly distinguish between three of the five colors. In such case, the liveness detector 220 may further adjust the color display parameter for the dynamically adjusted circular shape such that the circular shape changes its color between only three colors in the certain frequency, in particular the liveness detector 220 may remove two of the three indistinguishable colors such that the liveness detector 220 may accurately distinguish between the colors. In another example, assuming a certain dynamically changing pattern defines adjusting one or more display parameters, for example, a rotation speed of a certain visual object, for example, a 3D cube. Further assuming that while analyzing the images depicting one or more reflections of the 3D cube in one or more reflecting surfaces associated with the user 204, the liveness detector 220 determines that the rotation speed is too high to accurately determine the exact orientation of the 3D cube in each of the images. In such case, the liveness detector 220 may further adjust the rotation speed display parameter for the dynamically adjusted 3D cube such that the 3D cube rotates at a lower rotation speed that may be accurately identified by the liveness detector 220.

Optionally, the liveness detector 220 may adjust one or more of the display parameters of one or more of the dynamically adjusted visual objects according to one or more illumination conditions identified in an environment of the client device 202. For example, assuming a certain dynamically changing pattern defines adjusting one or more display parameters, for example, a color of a certain visual object, for example, a triangle such that the triangle changes its color between two dark colors, for example, dark blue and black. Further assuming that while analyzing the images depicting one or more reflections of the triangle in one or more reflecting surfaces associated with the user 204, the liveness detector 220 identifies a low illumination condition which leads to inability of the liveness detector 220 to accurately distinguish between the dark blue color and the black color. In such case, the liveness detector 220 may further adjust the color display parameter for the dynamically adjusted circular shape such that the triangle changes its color between a dark color, for example, black and a light color, for example, white which may be accurately distinguishable by the liveness detector 220 even in low illumination conditions.

Optionally, the liveness detector 220 may adjust one or more of the display parameters of one or more of the dynamically adjusted visual objects according to one or more operational parameters of one or more of the imaging sensor(s) 206 capturing one or more of the sequences of images.

For example, assuming a certain dynamically changing pattern defines adjusting one or more display parameters, for example, a texture of a certain visual object, for example, a certain textual element such that the texture of the certain textual element is switched between a pattern of densely distributed small dots and a pattern of densely distributed small cubes. Further assuming that while analyzing the images depicting one or more reflections of the certain textual element in one or more reflecting surfaces associated with the user 204, the liveness detector 220 fails to accurately distinguish between the small dots and the small cubes due to low resolution of the imaging sensor(s) 206 which captured the images. In such case, the liveness detector 220 may further adjust the texture display parameter for the dynamically adjusted certain textual element such that the texture of the certain textual element alternates between two patterns which may be distinguishable from each other even with the low resolution images captured by the low resolution imaging sensor(s) 206, for example, a low density distribution of larger dots and larger cubes.

As shown at 710, the liveness detector 220 may analyze the consecutive images depicting the user 204, specifically analyze one or more sections the images which contain the reflecting surface(s) to identify a reflection of the visual object(s) adjusted according to the dynamically changing pattern in one or more of the reflecting surface(s) associated with the user 204.

The liveness detector 220 may further analyze the reflection(s) of the dynamically changing visual object(s) to identify and extract one or more of a plurality of reflection attributes of the dynamically changing visual object(s) in each reflection, for example, dimensional attributes, appearance attributes and/or the like such as, for example, an orientation, a rotation angle, a transformation, a color, a texture, a dimension, a shape, a brightness, a textual content, a distance, a proportion and/or the like.

Specifically, since the visual object(s) are dynamically adjusted over time according to the dynamically changing pattern(s) such that their display parameters dynamically change, the liveness detector 220 analyzing multiple consecutive images may identify one or more of the dynamic changes in the reflection attributes, for example, a color change, a brightness change, a dimension change, an orientation change, a transformation, a text change (character(s), string(s), etc.), a shape change and/or the like.

As shown at 712, based on the reflection attribute(s) extracted from the reflection(s) identified in one or more of the reflecting surface, specifically the dynamically changing reflection attribute(s), the liveness detector 220 may verify liveness of the user 204 in order to determine and/or estimate whether the users are genuinely live users or potential imposters, specifically synthetic media executed to simulate and/or impersonate as the real users, for example, a "deep fake" simulation and/or the like.

As described in the process 100, the liveness detector 220 may apply one or more methods, techniques and/or algorithms to analyze the extracted dynamic reflection attribute(s) in order to determine and/or verify liveness of the user 204.

For example, the liveness detector 220 may analyze the extracted reflection attribute(s), specifically reflection attribute(s) which change over time with respect to one or more rules predefined for computing and/or determining whether the reflection attribute(s) indicate that the user 204 is a genuinely live user or a potential impersonator, specifically a synthetic simulation media. In particular, the liveness detector 220 may analyze the reflection attribute(s) in a plurality of points in time and compare them with respective expected reflection attribute(s) at the same time points derived, computed and/or determined according to the timing of the dynamically changing pattern according to which the visual object(s) are dynamically adjusted by the liveness detector 220 in strep 704. For example, the predefined rules may define one or more allowable and/or typical deviations and/or distortions in one or more of the reflection attributes which may be caused by one or more parameters of one or more of the reflecting surface(s), for example, an imperfect surface which may distort one or more of the dimension attributes, a partially translucent surface which may alter one or more of the appearance attributes (e.g. brightness, color, etc.) and/or the like.

For example, one or more of the rules may define a value for one or more dimension attributes of one or more of the dynamically adjusted visual object(s), specifically dynamically changing dimension attributes. For example, assuming a certain dynamically adjusted visual object comprises a cube which is dynamically rotated whole displayed on the screen. In such case one or more of the predefined rules may indicate comparing the reflection attributes expressing the orientation of the displayed cube with the actual rotation of the cube as instructed by the liveness detector 208. In another example, assuming a certain dynamically adjusted visual object comprises a certain shape having a certain color and/or texture which is alternately displayed and not displayed on the screen 208. In such case one or more of the predefined rules may indicate comparing the reflection attributes expressing a frequency and/or events of appearance of the certain shape with the actual frequency and/or events as instructed by the liveness detector 208.

Moreover, one or more of the rules defined for analyzing the reflection attributes to determine their compliance with a live user may be derived from one or more rule based models, for example, models representing one or more of the dynamically adjusted visual objects displayed on the screen 208 of the client device 202. Such models may include, for example, one or more structural models of the client device 202, for example, a 3D model of one or more of the dynamically adjusted visual objects expressing dimensions, appearance attributes and/or the like of the respective dynamically adjusted visual object. For example, assuming a certain dynamically adjusted visual object comprises a certain rotating cube which changes colors at a certain frequency. Further assuming a certain rule based model is computed to represent the rotating cube while rotated at one or more frequencies and changes colors at one or more frequencies. In such case one or more of the predefined rules may indicate comparing the reflection attributes expressing the cube rotation frequency and/or the color changing frequency with respective computed frequency(s) defined by the certain rule based model.

In another example, the liveness detector 220 may apply one or more of the trained ML models to the received consecutive images depicting the reflecting surface(s) reflecting at least part of one or more of the dynamically adjusted visual objects to determine and verify the reflection (s) complies with a live user. The ML model(s) may be trained with training datasets expressing a plurality of reflections of selected visual objects displayed on screen 208 of client devices 202 in one or more of the reflecting surfaces associated with one or more users 204. Specifically, the ML model(s) may be trained with a plurality of consecutive images depicting the reflections of the visual objects which are dynamically adjusted over time, optionally in a random manner. Since the dynamically changing pattern including its randomness may be known when training the ML model (s) (while unknown to users 204 and/potentials impersonators), During the training the ML model(s) may extract from the images a plurality of reflection attributes which are defined as valid, genuine and/or legitimate for the respective visual objects and may be therefore regraded as reference reflection attributes. The ML model(s) may thus learn (create) the reference reflection attributes and may adjust accordingly their internal structure, weights and/or the like as known in the art to reflect one or more of the extracted reference reflection attributes typical to one or more of the dynamically adjusted visual objects.

The ML model(s) trained with the training samples (images) depicting the reflections of dynamically adjusted visual objects in the reflecting surfaces which may have different parameters may further learn the deviations and/or distortions typical to these reflecting surfaces due to their parameters. The ML model(s) may therefore adjust their structure and/or weights accordingly to compensate for the typical deviations and/or distortions. Moreover, the ML model(s) may optionally further evolve after deployment to further adjust and learn the deviations and/or distortions typical to the one or more specific reflecting surfaces associated with the specific user 204.

As described herein before for the process 100, the liveness detector 220 may optionally determine the liveness of the user 204 to verify the user 204 is alive or determine that the user 204 is a potential impersonator, specifically synthetic media configured and executed to simulate the user 204, based on one or more of the plurality of reflection attributes of a plurality of reflections identified in a plurality of reflecting surfaces associated with the user 204.

The liveness detector 220 may analyze the received consecutive images to identify a plurality of reflecting surfaces associated with the user 204, for example, two eyes, two eyes and a glasses lens, two glasses lenses and a metal necklace and/or the like. The liveness detector 220 may further analyze the plurality of reflecting surfaces to identify a plurality of reflections of at least part of one or more of the dynamically adjusted visual object(s) displayed on the screen 208 of the client device 202 each in a respective one of the plurality of reflecting surfaces and may extract one or more reflection attributes from each of the plurality of reflections.

The liveness detector 220 may correlate between the reflection attribute(s) identified (extracted) in the plurality of reflections and may determine and/or verify liveness of the user 204 based on the correlation. For example, the liveness detector 220 may compute one or more dimension attributes of one or more of the dynamically adjusted visual objects, for example, the width, the height and/or the like in each of each of at least some of the reflections. In particular, the liveness detector 220 may compute the dimension attributes which are adjusted (change) over time for each of at least some of the reflections. The liveness detector 220 may then correlate and compare between the dimension attribute(s) computed for each of the reflections to verify that the dimension attributes are compliant (equal) with each other. In another example, the liveness detector 220 may extract one or more appearance attributes of one or more of the dynamically adjusted visual objects, for example, the color, the texture, the orientation and/or the like from each of at least some of the reflections. The liveness detector 220 may then correlate and compare between the appearance attribute (s) extracted from each of the reflections to verify that they comply (match) with each other.

The liveness detector 220 may correlate between the reflection attribute(s) extracted from the plurality of reflections in the plurality of reflecting surfaces based on a distance between the plurality of reflecting surfaces and/or the distance between one or more of the plurality of reflecting surfaces and one or more of the imaging sensor(s) 206 capturing the sequence of images. To this end the liveness detector 220 may apply one or more algebraic, geometric and/or trigonometric calculations as known in the art for computing differences between the correlated reflection attribute(s), for example, dimension attributes extracted from the plurality of reflections in the plurality of reflecting surfaces.

The liveness detector 220 may further determine and verify liveness of the user 204 based on correlation between the reflection attribute(s) extracted from one or more of the plurality of reflections, specifically the dynamically changing reflection attribute(s) and further with respect to respective expected reflection attribute(s). To this end the liveness detector 220 may apply the rule based approach and/or the ML model(s) method. For example, assuming the liveness detector 220 computes one or more of the dimension attributes of a certain dynamically adjusted cube, for example, the width, the height and/or the like in each of at least some of the reflections, specifically the dynamically adjusted dimension attribute(s) which change over time as reflected in the received consecutive images. The liveness detector 220 may further compare the dynamically changing dimension attribute(s) computed based on each of the reflections to a value of the respective dimension(s) predefined by one or more of the rules and/or the rule based models. In another example, the liveness detector 220 may apply one or more of the ML models to the images of the plurality of reflecting surfaces reflecting the dynamically adjusted visual objects to determine liveness of the user 204.

The liveness detector 220 may therefore determine liveness of the user 204, specifically verify that the user 204 is a live user or determine that the user 204 is a potential impersonator by analyzing the reflection attribute(s) extracted from the image(s) of the reflection of the client device 202 in one or more of the reflecting surface(s) associated with the user 204 compared to expected reflection attribute(s), either predefined by the rules and/or learned by the ML model(s).

As described in the process 100, based on the analysis of the reflection(s) and the extracted reflection attributes, the liveness detector 220 may further compute a liveness score (value) for the use 204 which may indicate the grade (level) of the liveness of the user 204 as estimated by the liveness detector 220, the certainty, probability and/or accuracy of the liveness verification as estimated by the liveness detector 220 and/or the like.

As described herein before for the process 100, when analyzing the extracted reflection attribute(s), the liveness detector 220 may optionally apply one or comparison and matching methods, techniques and/or modes. For example, the liveness detector 220 may apply a strict comparison mode such that even a small deviation(s) of the extracted dynamically changing reflection attribute(s) compared to the expected dynamically changing reflection attribute(s) may be unacceptable and the liveness detector 220 may therefore determine that the user 204 is not a live user but rather may be a potential impersonator. Such operation mode may be desirable for high security, high privacy and/or sensitive online services accessed by the user 204. In another example, the user liveness detector 220 may apply a looser comparison mode in which lower deviation thresholds may be applied such that some deviations of the extracted dynamically changing reflection attribute(s) compared to the expected dynamically changing reflection attribute(s) may be acceptable and regarded as compliant, i.e., the user 204 is determined and verified to be a genuinely live user.

Figure 8:
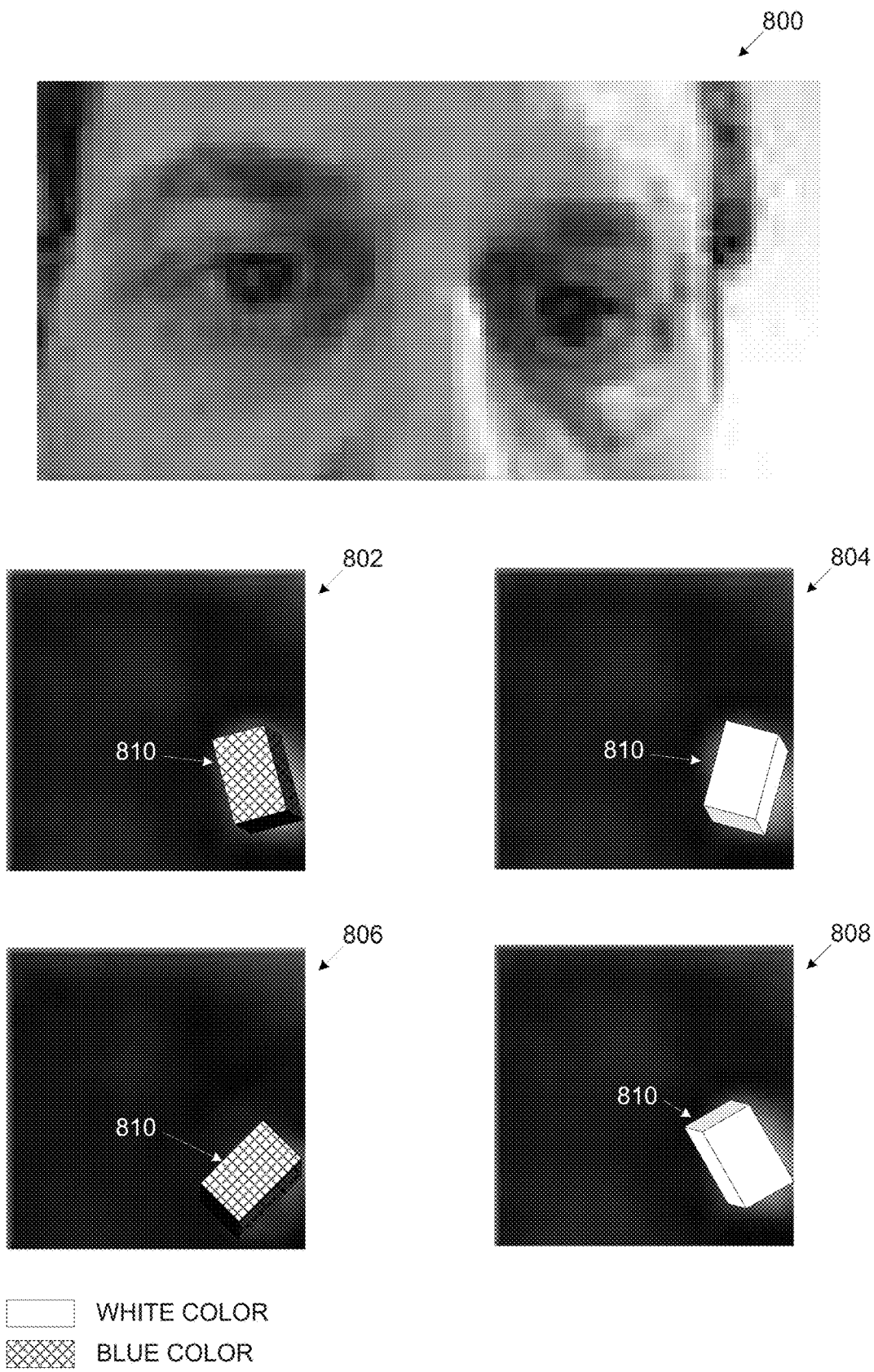
FIG. 8 presents image captures of exemplary reflections of a visual object displayed by a client device used by a user system which are analyzed to determine liveness of the user, according to some embodiments of the present invention.

Reference is now made to FIG. 8, which presents image captures of exemplary reflections of a visual object displayed by a client device used by a user system which are analyzed to determine liveness of the user, according to some embodiments of the present invention.

An image capture 800 depicts the right and left eyes of an exemplary user such as the user 204 using a client device 202 such as the client device 202, for example, a smartphone, to access one or more of the online services.

A liveness detector such as the liveness detector 220 may adjust the visual content displayed by a screen such as the screen 208 of the client device 202 to display one or more dynamically adjusted visual objects, for example, a cube 810. The liveness detector 220 may dynamically adjust one or more display parameters of the cube 810, for example, the orientation and the color of one or more faces of the cube 810 such that the cube 810 may dynamically rotate on the screen 208 and change its color over time.

The liveness detector 220 may receive a sequence of images comprising a plurality of consecutive images depicting one or more reflecting surfaces associated with the user 204, for example, the left eye of the user 204.

The liveness detector 220 may analyze at least some of the consecutive images depicting the left eye of the user, specifically the lens and pupil area of the eye, for example, an image 802, an image 804, an image 806 and an image 808. The liveness detector 220 may further analyze the reflection of the dynamically adjusted cube 810 identified in one or more of the images 802, 804, 806 and/or 808 to identify and extract one or more of the plurality of reflection attributes relating to the rotating and color changing cube 810. As such, the liveness detector 220 may identify and extract reflection attributes expressing the orientation and/or the color of the cube 810 in each of the images 802, 804, 806 and/or 808.

The liveness detector 220 may then verify liveness of the user 204, specifically determine whether the user 204 is a genuinely live user or a potential impersonator, specifically a simulation synthetic media by analyzing the reflection attribute(s) relating to the dynamically adjusted cube 810 compared to the expected reflection attribute(s), i.e., the display parameters of the cube 810 either using the predefined rules and/or applying the trained ML model(s).

For example, as seen in image 802, the cube 810 having white and blue faces is orientated such that it is slightly tilted to the rear left where its front face is blue. In another example, as seen in image 804, the cube 810 is orientated such that it is slightly tilted to the rear right where its front face is white. In another example, as seen in image 806, the cube 810 is orientated such that it is significantly tilted to the rear right where its front face is blue again. In another example, as seen in image 808, the cube 810 is orientated such that it is slightly tilted to the front left where its front face is white again. The liveness detector 220 may then analyze the reflection attributes of the cube 810 expressing the orientation and the color of the cube 810 compared to the expected orientation and color, specifically the timing of the orientation and color reflection attributes as reflected by the capture timing of the images 802, 804, 806 and 808 compared to the adjustment timing of the cube 810.

Figure 9A:
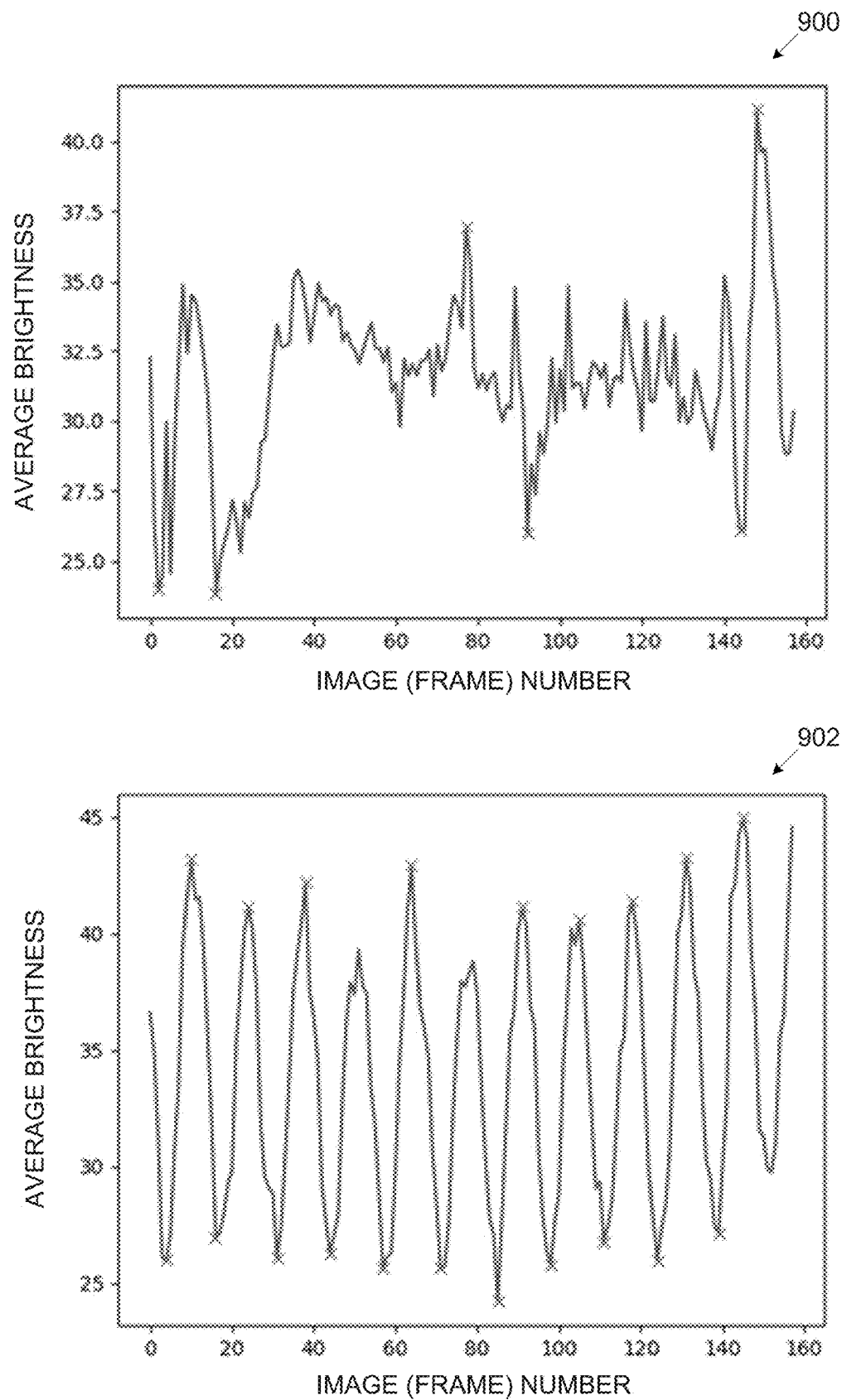
FIG. 9A and FIG. 9B present graph charts of brightness of reflected dynamic visual objects displayed on a screen of a client device used by a user which is analyzed to determine liveness of the user, according to some embodiments of the present invention.
Figure 9B:
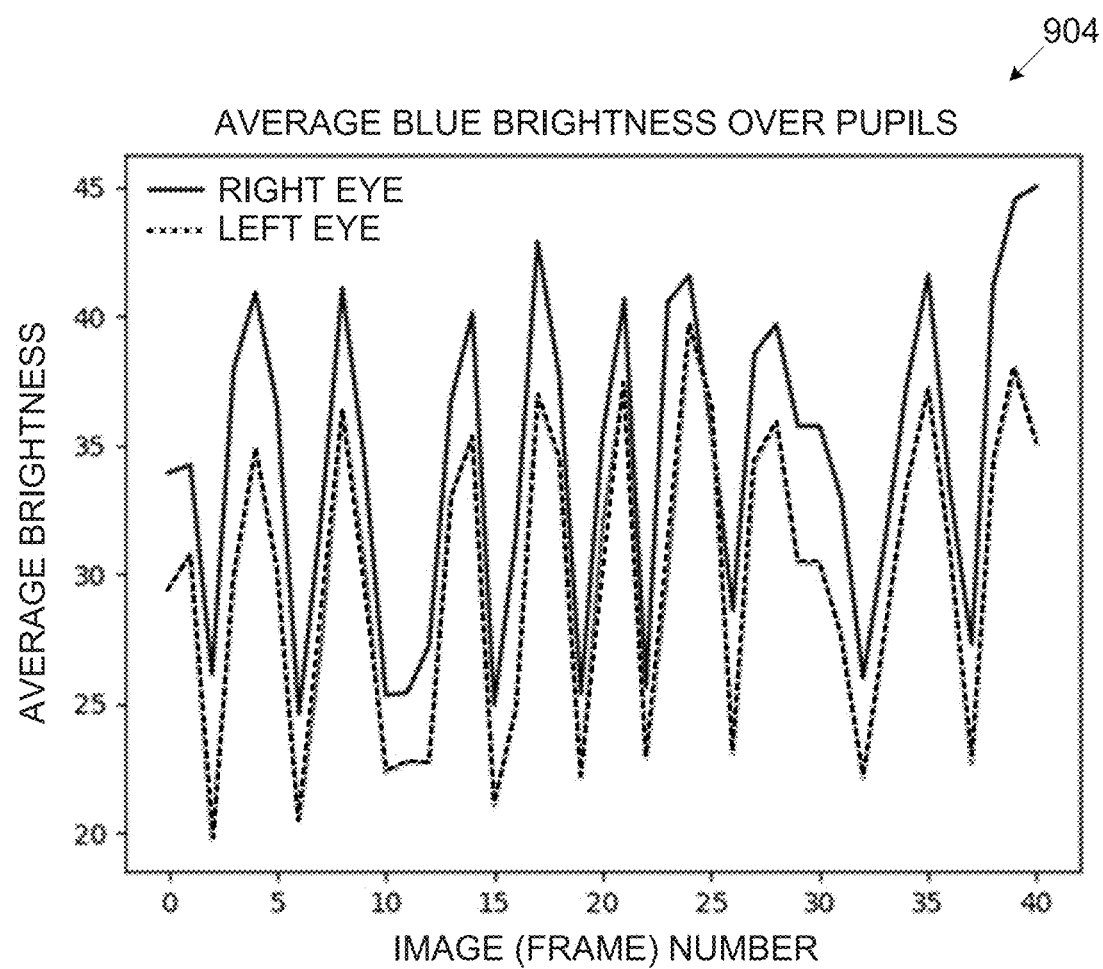

Reference is also made to FIG. 9A and FIG. 9B, which present graph charts of brightness of reflected dynamic visual objects displayed on a screen of a client device used by a user which is analyzed to determine liveness of the user, according to some embodiments of the present invention.

Exemplary graph charts 900, 902 and 904 may express a level of average brightness of a blue color reflection attribute identified and extracted by the liveness detector 220 from one or more reflections of the cube 810 displayed on the screen 208 in one or more of the reflecting surfaces associated with the user 204, for example, the left eye of the user 204 as demonstrated in FIG. 8.

The dynamically changing pattern used by the liveness detector 220 to adjust the cube 810 may define that the cube 810 is rotated such that only its white colored faces are facing the front and thus visible on the screen 208. As seen in the graph chart 900, in such case the average blue color brightness detected by the liveness detector 220 in images captured may not originate at the cube 810 and may thus may be significantly low as it may relate to one or more visual objects arbitrarily displayed on the screen 208 which have blue color.

As seen in graph chart 902, there are distinct peaks of the average blue color brightness detected by the liveness detector 220 in images captured while the cube 810 displayed on the screen 208 is rotated, specifically while the blue faces of the cube 810 face the front and are thus visible on the screen 208. The liveness detector 220 may therefore verify compliance of level and timing of the extracted average blue color brightness reflection attribute by computing the timing of the average blue color brightness peaks identified in the images and compare them with expected level and timing which may be computed, derived and/or determined based on the timing of the dynamically changing pattern used by the liveness detector 220 to adjust, specifically rotate the cube 810.

Moreover, the liveness detector 220 may extract the average blue color brightness reflection attribute from two reflections of the cube 810 identified in two reflecting surfaces associated with the user, specifically both eyes of the user 204, namely the left eye and the right eye.

As seen in graph chart 904, the liveness detector 220 may extract the average blue color brightness reflection attribute extracted from the reflection in the right eye (marked with a solid line) and from the reflection in the left eye (marked with dashed line). As evident, the value of the average blue color brightness reflection attribute extracted from the reflection in the right eye is consistently higher the average blue color brightness reflection attribute extracted from the reflection in the right eye. This may result from one or more view parameters of the two eyes, for example, different view angles with respect to the imaging sensor 206, lower illumination of the right eye and/or the like. Never the less, the average blue color brightness reflection attribute extracted from each of the two reflections includes distinct peaks. The liveness detector 220 may therefore verify compliance of the level and timing of the average blue color brightness reflection attribute extracted from the reflections in both eyes by correlating them with each other to verify they are complaint with each other. The liveness detector 220 may further verify the compliance of the level and timing of the average blue color brightness reflection attribute extracted from the two reflections by comparing them with the expected level and timing determined based on the dynamically changing pattern. It should be noted that the liveness detector 220 may derive and/or adjust the expected level and timing of the average blue color brightness reflection attribute based on the different view parameters of the two eyes which may be determined by analyzing the images depicting the two eyes (not necessarily the reflections), for example, different view angles, different illumination and/or the like.

Reference is made once again to FIG. 7.

As shown at 714, which is a conditional step, in case the liveness detector 220 determines and/or verifies that the user 204 is a genuine live user, the process 100 may branch to 716. However, in case the liveness detector 220 determines that the user 204 may be a potential impersonator, the process 700 may branch to 718.

Optionally in case the liveness detector 220 computes the liveness score for the use 204, the process 700 may branch to 716 in case the liveness score exceeds a certain threshold value while in case the liveness score does not exceed the certain threshold value, the process 700 may branch to 718. The certain threshold which may be predefined and/or dynamically adjusted may be set in the range of the liveness score (e.g. "0" to "1"), for example, 0.75, 0.85, 095 and/or the like.

As shown at 716, since the user 204 is determined to be a live user, the liveness detector 220 may output an indication accordingly indicating that the user 204 is estimated to be a genuine live user. Optionally, in case it computed the liveness score, the liveness detector 220 may further output the liveness score.

As shown at 718, since the liveness detector 220 failed to verify the user 204 as a live user but rather determines that the user 204 may be a potential impersonator, the liveness detector 220 may output an indication accordingly indicating that the user 204 is estimated to be an impersonator. Optionally, in case it computed the liveness score, the liveness detector 220 may further output the liveness score.

The liveness detector 220 may output the indication of whether the user 204 is successfully verified as a genuine live user or not using one or more operation modes depending on the implementation, operations and/or deployment mode of the liveness detector 220 as described herein before in the process 100.

As described herein before, verifying liveness of the user 204 is not directed to authenticate the user 204 but rather to support one or more authentication systems configured to authenticate the user 204 accessing the online service(s). The authentication system(s) may use the liveness verification indication received from the liveness detector 220 indicating whether the user 204 is estimated to be alive or a potential impersonator, specifically a synthetic media simulating the user 204 typically coupled with other authentication detectors, indicators and/or sub-systems (e.g. password, code, biometric signatures, etc.) to verify and/or authenticate the user 204. Moreover, in case the liveness score is computed and received from the liveness detector 220, the authentication system(s) may use, evaluate and/or analyze the liveness score, optionally coupled with the other authentication detectors, indicators and/or sub-systems to verify and/or authenticate the user 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models and imaging sensors are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of determining liveness of a user, comprising:
   using at least one processor for:
   receiving a sequence of images depicting at least one reflecting surface associated with a user using a client device to access at least one online service;
   analyzing at least one image of the sequence to identify a reflection of at least part of the client device in at least part of the at least one reflecting surface;
   extracting at least one of a plurality of reflection attributes of the identified reflection of the at least part of the client device; and
   verifying liveness of the user according to compliance of the at least one reflection attribute with a corresponding at least one expected reflection attribute indicative of a real user.

2. The method of claim 1, wherein the at least one reflecting surface is a member of a group consisting of: an eye of the user, a lens of glasses worn by the user, a wearable item worn by the user and a reflecting object located in an environment of the user.

3. The method of claim 1, wherein the plurality of reflection attributes are selected from a group consisting of: an orientation, a rotation angle, a reflected object, a color of a reflected object, a texture of a reflected object, a dimension of a reflected object, a distance of a reflected object, and a proportion of a reflected object.

4. The method of claim 1, wherein the at least one processor is further configured to verify liveness of the user based on compliance of at least one of the plurality of reflection attributes of a plurality of reflections identified in a plurality of reflecting surfaces associated with the user by:
   receiving a sequence of images depicting the plurality of reflecting surfaces,
   analyzing at least one image of the sequence to identify a respective one of a plurality of reflections of at least one part of the client device in a respective one of the plurality of reflecting surfaces, extracting at least one the plurality of reflection attributes of each of the plurality of reflections, and verifying liveness of the user based according to compliance of the at least one reflection attribute of each reflection with a corresponding at least one expected reflection attribute indicative of a real user.

5. The method of claim 1, wherein the compliance of the at least some reflection attributes of the identified reflection with the corresponding at least one expected reflection attribute is defined by at least one reflection rule.

6. The method of claim 1, wherein the compliance of the at least some reflection attributes of the identified reflection with the corresponding at least one expected reflection attribute is determined by at least one trained machine learning (ML) model.

7. The method of claim 6, wherein the at least one trained ML model is trained to learn a plurality of valid reflection attributes of reflections from reflecting surfaces associated with real users and determine accordingly whether the at least one reflection attribute complies with the corresponding at least one expected reflection attribute.

8. The method of claim 6, wherein the at least one trained ML model is further trained to learn at least one distortion typical to the at least one reflecting surface and determine accordingly whether the at least one reflection attribute complies with the corresponding at least one expected reflection attribute.

9. The method of claim 1, wherein liveness of the user is verified to support authentication of the user using the client device for at least one of: access at least one secure online service, and engaging in a video session.

10. A system for determining liveness of a user, comprising:
at least one processor configured to execute a code, the code comprising:
code instruction to receive a sequence of images depicting at least one reflecting surface associated with a user using a client device to access at least one online service;
code instruction to analyze at least one image of the sequence to identify a reflection of at least part of the client device in at least part of the at least one reflecting surface;
code instruction to extract at least one of a plurality of reflection attributes of the identified reflection of the at least part of the client device; and
code instruction to verify liveness of the user according to compliance of the at least one reflection attribute with a corresponding at least one expected reflection attribute indicative of a real user.

11. The system of claim 10, wherein the at least one reflecting surface is a member of a group consisting of: an eye of the user, a lens of glasses worn by the user, a wearable item worn by the user and a reflecting object located in an environment of the user.

12. The system of claim 10, wherein the plurality of reflection attributes are selected from a group consisting of: an orientation, a rotation angle, a reflected object, a color of a reflected object, a texture of a reflected object, a dimension of a reflected object, a distance of a reflected object, and a proportion of a reflected object.

13. The system of claim 10, wherein the at least one processor is further configured to verify liveness of the user based on compliance of at least one of the plurality of reflection attributes of a plurality of reflections identified in a plurality of reflecting surfaces associated with the user by:
receiving a sequence of images depicting the plurality of reflecting surfaces,
analyzing at least one image of the sequence to identify a respective one of a plurality of reflections of at least one part of the client device in a respective one of the plurality of reflecting surfaces,
extracting at least one the plurality of reflection attributes of each of the plurality of reflections, and
verifying liveness of the user based according to compliance of the at least one reflection attribute of each reflection with a corresponding at least one expected reflection attribute indicative of a real user.

14. The system of claim 10, wherein the compliance of the at least some reflection attributes of the identified reflection with the corresponding at least one expected reflection attribute is defined by at least one reflection rule.

15. The system of claim 10, wherein the compliance of the at least some reflection attributes of the identified reflection with the corresponding at least one expected reflection attribute is determined by at least one trained machine learning (ML) model.

16. The system of claim 15, wherein the at least one trained ML model is trained to learn a plurality of valid reflection attributes of reflections from reflecting surfaces associated with real users and determine accordingly whether the at least one reflection attribute complies with the corresponding at least one expected reflection attribute.

17. The system of claim 15, wherein the at least one trained ML model is further trained to learn at least one distortion typical to the at least one reflecting surface and determine accordingly whether the at least one reflection attribute complies with the corresponding at least one expected reflection attribute.

18. The system of claim 10, wherein liveness of the user is verified to support authentication of the user using the client device for at least one of: access at least one secure online service, and engaging in a video session.

19. The system of claim 10, wherein the at least one processor configured to execute the code for verifying liveness of the user is deployed in the client device.

20. The system of claim 10, wherein the at least one processor configured to execute the code for verifying liveness of the user is deployed in a remote server communicatively coupled to the client device via at least one network.

* * * * *